United States Patent [19]

Kravitz

[11] Patent Number: 6,029,150
[45] Date of Patent: Feb. 22, 2000

[54] PAYMENT AND TRANSACTIONS IN ELECTRONIC COMMERCE SYSTEM

[75] Inventor: David William Kravitz, Albuquerque, N.Mex.

[73] Assignee: Certco, LLC, New York, N.Y.

[21] Appl. No.: 08/726,434

[22] Filed: Oct. 4, 1996

[51] Int. Cl.⁷ .................................................. G06F 17/60
[52] U.S. Cl. .................................. 705/39; 902/5; 380/24
[58] Field of Search ................................ 705/27, 26, 40, 705/39, 413, 44; 902/1, 2, 5, 24, 37; 380/24, 30

[56] References Cited

U.S. PATENT DOCUMENTS

| | | |
|---|---|---|
| 4,529,870 | 7/1985 | Chaum . |
| 4,759,063 | 7/1988 | Chaum . |
| 4,759,064 | 7/1988 | Chaum . |
| 4,856,061 | 8/1989 | Thrane ...................................... 380/48 |
| 4,914,698 | 4/1990 | Chaum . |
| 4,926,480 | 5/1990 | Chaum . |
| 4,947,430 | 8/1990 | Chaum . |
| 4,949,380 | 8/1990 | Chaum . |
| 4,987,593 | 1/1991 | Chaum . |
| 4,991,210 | 2/1991 | Chaum . |
| 4,996,711 | 2/1991 | Chaum . |
| 5,131,039 | 7/1992 | Chaum . |
| 5,276,736 | 1/1994 | Chaum . |
| 5,373,558 | 12/1994 | Chaum . |
| 5,434,919 | 7/1995 | Chaum . |
| 5,448,638 | 9/1995 | Johnson et al. ..................... 705/413 X |
| 5,453,601 | 9/1995 | Rosen . |
| 5,455,407 | 10/1995 | Rosen . |
| 5,485,520 | 1/1996 | Chaum et al. . |
| 5,493,614 | 2/1996 | Chaum . |
| 5,557,518 | 9/1996 | Rosen . |
| 5,621,797 | 4/1997 | Rosen . |
| 5,642,419 | 6/1997 | Rosen . |
| 5,671,280 | 9/1997 | Rosen . |
| 5,757,917 | 5/1998 | Rose et al. ............................. 705/26 X |
| 5,768,385 | 6/1998 | Simon ...................................... 380/24 |
| 5,794,221 | 8/1998 | Egendorf .................................... 705/40 |
| 5,809,144 | 9/1998 | Sirbu et al. ........................... 705/27 X |
| 5,832,089 | 11/1998 | Kravitz et al. ....................... 705/39 X |

FOREIGN PATENT DOCUMENTS

| | | |
|---|---|---|
| 0 731 580 | 9/1996 | European Pat. Off. . |
| 0 693 742 | 1/1996 | Germany . |
| WO 96/13013 | 5/1996 | WIPO . |

OTHER PUBLICATIONS

Tang, "A Set of Protocols for Micropayments in Distributed Systems" First USENIX Workshop on Electronic Commerce pp. 107–115 Jul. 1995.

European Search Report, dated Mar. 12, 1998.

Marvin Sirbu, et al, NetBill: An Internet Commerce System Optimized for Network Delivered Services, Digest of Papers of the Computer Society Conference(Spring) Compcon, Technologies for the Information Superhighway San Francisco, Mar. 5–9, 1995, pp. 20–25.

(List continued on next page.)

*Primary Examiner*—Melanie A. Kemper
*Attorney, Agent, or Firm*—IP Group of Pillsbury Madison & Sutro, LLP

[57] ABSTRACT

A method of payment in an electronic payment system wherein a plurality of customers have accounts with an agent. A customer obtains an authenticated quote from a specific merchant, the quote including a specification of goods and a payment amount for those goods. The customer sends to the agent a single communication including a request for payment of the payment amount to the specific merchant and a unique identification of the customer. The agent issues to the customer an authenticated payment advice based only on the single communication and secret shared between the customer and the agent and status information which the agent knows about the merchant and/or the customer. The customer forwards a portion of the payment advice to the specific merchant. The specific merchant provides the goods to the customer in response to receiving the portion of the payment advice.

47 Claims, 20 Drawing Sheets

OTHER PUBLICATIONS

Brickell et al., Trustee–Based Tracing Extensions to Anonymous Cash and the Making of Anonymous Change, Proc, 6th Annual ACM–SIAM Symposium on Discrtet Algorithms, pp. 457–466, 1995.

Okamoto et al., Universal Electronic Cash, Crypto '91, NTT Laboratories, pp. 325–337.

Okamoto et al., Disposable Zero–Knowledge Authentications and Their Applications to Untraceable Electronic Cash, Crypto '89, NTT Communications and Information Processing Laboratories, pp. 480–496.

Eng et al., Single–Term Divisible Electronics Coins, Eurocrypt '94, pp. 307–319.

David Chaum, Wallet Databases with Observers, Crypto '92, pp. 88–105.

David Chaum, Transferred Cash Grows in Size, Crypto '92, pp. 391–407.

"The First Virtual Solution", First Vitual, System Overview, Mar. 31, 1997, p. 1, http://www.fv.com/demo/.

The First Virtual Team, "Perils and Pitfalls of Practical Internet Commerce (Part I)", The Lessons of Fisrt Vitual's First Year, Company Information, First Virtual, Mar. 31, 1997, pp. 1–20, http://www.fv.com/company/first year1.html.

The First Virtual Team, Perils and Pitfalls of Practial Internet Commerce (Part II), The Lessons of First Virtual's First Year, Company Information, Mar. 31, 1997, pp. 1–34, http://www.fv.com/company/first_year2.html.

Pays et al., "An Intermediation and Payment System Technology", Fifth International World Wide Web Conference, May 6–10, 1996, Paris, France, pp. 1–12, http://www/5conf.inria.fr/fich html/papers/P27/Overview.htm.

Alan Kotok, "GloblD Payment System", Nov. 1996, pp. 1–6, http://www.gctec.com/us/products/GlobelDPayment/gctechwhitepapers/globeidpayment.htm.

"GobelD Payment: An Intermediation and payment system technology", p. 1 of 1, http://www.gctec.com/us/products/GlobelDPayment/gctechwhitw papers/wpglobeid.htm.

Cohen et al., "Electronic commerce: Beyond a simple change of medium", INET Ideas, May 1996, pp. 1–13, http://www.gctec.com/us/products/GlobelDPayment/gctechehitepapers/beyondchangeofmedium/3/31/91:ronicom.

"GlobelD Payment FAQ General issues", pp. 1–4, http:/www/gctec.com/us/products/GobelDPayment/GlobelD-FAQ/globeidfaq.htm.

"GlobelD Payment model", p. 1 of 1, http://www.gctec.com/us/products/GlobelDPayment/globeidmodel.htm.

"FAQ about the GlobelD Technology", p. 1 of 7, http://www.gctec.com/us/Technical/FAQ.

Rivest et al.,"Payword and MicroMint: Two Simple micropayment schemes", Nov. 8, 1995, pp. 1–9.

Bellare et al., "iKP—A Family of Secure Electronic Payment Protocols", USENIX Association Firt USENIX Workshop on Electronic Commerce—Jul. 11–12, 1995.

J.D. Tygar, "Atomicity in Electric Commerce", 1996, pp. 8–26.

Sirbu et al., "NetBill: An Internet Commerce System Optimized for Network Delivered Services", The Netbill Overview, p. 1 of 2, http://www.ini.cmu.edu/netbill/pubs/ComCon TOC.htm.

NetBill: An Internet Commerce System Optimized for Netwoek Delivered Services:, The Netbill Overview, pp. 1–10, http://www.ini.cmu.edu/netbill/pubs/CompCon.htm#RTFToC.

Cox et al., "NetBill Security and Transcation Protocol", Carnegie Mellon University, USENIX Association First USENIX Workshop on Electronic Commerce—Jul. 11–12, 1995, pp. 77–87.

Neuman et al., "Requirements for Network Payment: The NetCheque TM Perspective", Information Sciences Institute University of Southern California, Proceeding of IEEE COMPCON '95, San Francisco, Mar. 1995.

Medvinsky et al., "Electronic Currency for the Internet", University of Southern California, Research Projects.

Medvinsky et al., "NetCash: A design for practical electronic currency on the Internet", Information Sciences Institute University of California.

"The Millicnet Protocol for Inexpensive Electronic Commerce", pp. 1–18, Nov. 8, 1996, http://www.research.digital.com/SRC/millicent/papers/millicent–w3c4/millicnet.htm.

Mark S. Manasse, "The Millicnet protocols for electronic commerce", Systems Research Center, USENIX Association First USENIX Workshop on Electronic Commerce—Jul. 11–12, 1995, pp. 117–123, http://www.research.digital.com/SRC/people/Mark Manasse/bio.html.

David Chaum, Blind Signature System (Abstract), Crypto '83.

Stefan Brands, "Untraceable Off–line Cash in Wallet with Observers", Crypto '83, pp. 302–318.

Crepeau et al., "Discreet Solitary Games", Liens (CNRS URA 1327) and NEC Research Institute, 1992.

David Chaum, "Online Cash Checks", EUROCRYPT '89, Centre for Mathematics and Computer Science, pp. 288–293.

G. Brassard, University of Montreal, Protocols, Chaum et al., "Untraceable Electronic Cash", Crypto '88, pp. 319–327, Centre for Mathematics and Computer Science, Tel–Aviv University, IBM Almaden Research Center.

CMTM: The G.C. Tech Transaction Model, E–mail to"e–payment@cc.bellcore.com", Jul. 11, 1995.

The Globe ID Payment System, Globe ID, on Internet at "http://www.gctec.com".

An Intermediation and Payment System Technology, Fifth International World Wide Web Conference, May 6–10, 1996, Paris, France, on Internet at http://wwwconf.inria.tr/tich htm/papers/P27/Overview.html.

GCTech's Intermediation and Payment System Technology, Boston, Dec. 11, 1995, on Internet at http://www.gctec.com/us/Technical/Slides/Boston Pres/img05.html.

Electronic Commerce:Beyond a simple change of medium, Francis Cohen, et al, Jun. 1996, on Internet at http://www.gctec.com/us/Technical/Papers/INET/inetpaper.html.

Intermediation and Payment System Technical OverviewL Products & Services on Internet at http://www.gctec.com/us/Products/gol4.html.

Fig. 4A 138

TRANSACTIONS

| PCSEQUENCE | CTRANS | TRANSTYPE | MID | MTRANS | DATE | TIME | AMOUNT | BALANCE |
|---|---|---|---|---|---|---|---|---|

Fig. 4B 140

QUOTES (Buyer Database)

| MID | MTRANS | QUOTE | RETAIN160 |
|---|---|---|---|

Fig. 4C 142

MERCHANTS

| MID | MNAME | MADDR1-MADDR3 |
|---|---|---|

Fig. 4D 144

PAYMENT ADVICES

| CTRANS | MID | MTRANS | PADVICE |
|---|---|---|---|

Fig. 4E 146

| PAYMENT REQUESTS | |
|---|---|
| CTRANS | PREQUEST |

Fig. 4F 148

| SERVICE REQUESTS | |
|---|---|
| CTRANS | SREQUEST |

Fig. 4G 150

| SHIPPING ADVICES | | |
|---|---|---|
| CTRANS | MID | MTRANS | SADVICE |

Fig. 4H 152

| GOODS | | | |
|---|---|---|---|
| CTRANS | FILENAME | CHUNKS | LAST |

Fig. 4I 154

| PENDING | | | | | | | |
|---|---|---|---|---|---|---|---|
| CTRANS | DELIVERED | MAGICNO | DECRYPTKEY | AUTHKEY | WTABITS1 | WTABITS2 | MERBITS1 | MERBITS2 | MERBIT3 |

Fig. 4J 156

| STATE | | | | | |
|---|---|---|---|---|---|
| CTRANS | ADD | RANDOM | RETRANS | NEXTTRANS | STATE | STATUS | TEXT |

Fig. 4K 158

| ERRORS | | | | | |
|---|---|---|---|---|---|
| CTRANS | DATE | TIME | SEVERITY | MSGNUM | MSGTEXT |

Fig. 6A 164

| QUOTES (Merchant Database) | | |
|---|---|---|
| MTRANS | QUOTE | RETAIN160 |

| | |
|---|---|
| PI. NO. | Bits(D-H Key$_{MERCHANT}$, 320,360) (saved Until conclusion of processing of transaction) |

Fig. 6B 166

| ADDRESSES (Merchant Database) | |
|---|---|
| CUSTNAME | CUSTADDR1-3 |

Fig. 6C 167

| PAYMENT ADVICES (Merchant Database) | |
|---|---|
| CUSTNAME | CUSTADDR1-3 |

Fig. 7A

QUOTE 126

| Transaction type and subtype "1001" | Sender Version | Minimum Compatible Version | Transaction Summary | Number of Items | Item Description (list) |
|---|---|---|---|---|---|
| Merchant ID | Merchant Transaction ID | Address Required? | Add'l Cost | Merchant Quote Total | Key Exchange URL |
| Item Quantity (list) | Item Cost (list) | Quote Subtotal | Offer time | Expire time | |
| Add'l Information | Currency | Allow Refunds? | | | |
| Payment URL | Merchant Certificate | | | | |

Fig. 7B

Key Exchange Message 170

| Transaction type and subtype "4001" | Sender Version | Minimum Compatible Version |
|---|---|---|
| Merchant Transaction ID | Z | Client Address (C40) |

Fig. 7C

Key Response Message 172

| Transaction Type and Subtype "1002" | Sender Version | Minimum Compatible Version |
|---|---|---|
| Encrypted Quotecheck | | |

Fig. 7D

Unsigned Payment Request (PR)

| MID | Tm | T$ | QPAL |
|---|---|---|---|
| SID | Tc | AID | RANDOM |
| PIN* | | | |

Portion of Payment Request Message to be Encrypted (E)

| Field | SID | Tc | AID | RANDOM | H_Final | DSAs(PR, customer) |
|---|---|---|---|---|---|---|
| Size in bits | 32 | 32 | 8 | 56 | 160 | 160 |

Payment Request Message 128

| Transaction type and subtype "2001" | Sender Version | Minimum Compatible Version | | |
|---|---|---|---|---|
| Z | MID | Tm | T$ | QPAL |
| DSAr(PR, Customer) | E' | | | |

Fig. 7E

Customer's Payment Advice Message 130

| Transaction type and subtype | Sender Version | Minimum Compatible Version | |
|---|---|---|---|
| "3001" = PAID<br>"3002" = REFUSED<br>"3003" = SERVICE UNAVAILABLE<br>(UNSIGNED) | | | |
| PA<br>(includes MID, Tm, T$, QPAL) | DSA(PA, CTA) | CA | $E_{CTA}$ |
| FLAGS | | | |

Fig. 7F

Merchant's Payment Advice Message 131

| Transaction type and subtype "3001" = PAID "3002" = REFUSED | Sender Version | Minimum Compatible Version |
|---|---|---|
| PA | DSA(PA, CTA) | |

Fig. 7G

Shipping Advice Message 178

| Transaction type and subtype "1003" | Sender Version | Minimum Compatible Version | | |
|---|---|---|---|---|
| Merchant Transaction ID | Delivery URL | Merchant Memo | | Number of Digital Parts |
| type of goods | suggested file name | File length | | |

Fig. 7H

| Payment Refused Message 180 | | |
|---|---|---|
| Transaction type and subtype "1004" | Sender Version | Minimum Compatible Version |
| Merchant Transaction ID | Merchant Memo | |

Fig. 7I

| Digital Goods Message 182 | | |
|---|---|---|
| Transaction type and subtype "1005" | Sender Version | Minimum Compatible Version |
| Merchant Transaction ID | File Name | File Length |
| type | | |

Fig. 7J

Previous-Transaction Mode Message 184

| Transaction type and subtype "4002" | Sender Version | Minimum Compatible Version |
|---|---|---|
| Bits(D-H Key$_{MERCHANT}$, 320, 160) ⊕ SHA (Processing Instructions ∥ Bits(D-H Key$_{MERCHANT}$, 160, 160)) | | |
| Processing instructions | Bits(D-H Key$_{MERCHANT}$, 0, 160) ⊕ Retain160 | |
| Tm | Date of transaction | |
| Z | | |

Fig. 7K

Refund Information Message 186

| Transaction type and subtype "3008" | Sender Version | Minimum Compatible Version | | Opening Balance |
|---|---|---|---|---|
| Record Count | Statement Start | Statement End | | Merchant Transaction ID |
| Closing Balance | Customer Transaction ID | Merchant ID | | Type "REFU" |
| Transaction Time | Transaction Amount | Currency | | SIGNATURE |

Fig. 7L

Funding Information Message 188

| Transaction type and subtype "3007" | Sender Version | Minimum Compatible Version | | Opening Balance |
|---|---|---|---|---|
| Record Count | Statement Start | Statement End | | Merchant Transaction ID |
| Closing Balance | Customer Transaction ID | Merchant ID | | Type "FUND" |
| Transaction Time | Transaction Amount | Currency | | SIGNATURE |

Fig. 7M

Statement Information Message 190

| Transaction type and subtype "3006" | Sender Version | Minimum Compatible Version | | |
|---|---|---|---|---|
| Record Count | Statement Start | Statement End | Opening Balance | |
| Closing Balance | Customer Transaction ID | Merchant ID | Merchant Transaction ID | |
| Transaction Time | Transaction Amount | Currency | Type | |
| | | | SIGNATURE | |

Fig. 7N

External Evidence Message 192

| Transaction type and subtype "3009" | Sender Version | Minimum Compatible Version | |
|---|---|---|---|
| Client Name | Client Address | Client Bank | Client Payment System Account Number |
| FIID | FI Transaction time | Merchant ID | Merchant Transaction ID |
| Merchant Payment Amount | Currency | QPAL | FI Signature |

Fig. 7P

Service Advice Message 194

| Transaction type and subtype "3004" = ACCEPTED "3005" = REJECTED | Sender Version | Minimum Compatible Version |
|---|---|---|
| $N_{MAGIC}$ | $Z_{SERVICE}$ | |
| CA* | E*$_{CTA}$ | Flags |

Fig. 7Q

Unsigned Service Request (SR)

| SIF | SID | TC | AID |
|---|---|---|---|
| RANDOM* | PIN* | | |

Portion of Service Request Message to be Encrypted (E*)

| Field | SID | TC | AID | RANDOM* | H*$_{Final}$ | DSAs(SR, Customer) |
|---|---|---|---|---|---|---|
| Size in bits | 32 | 32 | 8 | 56 | 160 | 160 |

Service Request Message 196

| Transaction type and subtype "2001" | Sender Version | Minimum Compatible Version |
|---|---|---|
| Z | DSAr(SR, Customer) | E*' | ns
PAYMENT AND TRANSACTIONS IN ELECTRONIC COMMERCE SYSTEM

FIELD OF THE INVENTION

This invention relates to electronic commerce, and, more particularly, to a system and method for payment and transactions in an electronic payment system.

BACKGROUND OF THE INVENTION

In rapidly growing numbers, businesses and consumers are moving their routine commercial activities into the electronic marketplace. The growth of electronic networks has given businesses of all sizes unprecedented access to new markets. At the same time, networks reduce the need for market intermediaries and their associated costs. Increased competition among sellers has reduced buyer costs.

Commercial enterprises are developing technologies to take advantage of the electronic marketplace. However, one area that significantly lags others is the development of systems for executing financial transactions of all types across electronic networks.

Financial transactions today take many forms: cash, check, credit card, debit card, automated teller, etc. The nature of the transaction determines which payment system is the method of choice:

Financial Payments ($500K+): Transactions in this range are predominantly payments between financial institutions using electronic systems such as CHIPS, FedWire and SWIFT.

Commercial Payments ($1000 to $500K): These are usually procurement payments between businesses. Since these transactions often require the exchange of documents, e.g., bids and proposals, Electronic Data Interchange (EDI) is commonly used.

Consumer Payments ($20 to $1000): At the higher end of the range, credit cards are generally used. While checks are also used, they have significantly less wide-spread acceptance, particularly among merchants, and are more often used for bill payment. At the lower end of this range, consumers are most likely to use cash. Credit cards are sometimes used as a cash substitute.

Paper Currency Payments ($1 to $20): The vast majority of all financial transactions fall in this range. The primary use of cash is for these payments.

Coin Transactions (under $1): Although the value of each transaction is low, the volume of transactions is high. These transactions are also highly diverse, ranging from buying newspapers to feeding parking meters.

Financial and commercial payments are already handled somewhat adequately by the systems which serve them. While improvements are possible, change is likely to be gradual.

Transactions in the lower range are far less efficient. Consumer payments by credit card are appropriate where an extension of credit is required. However, because a credit card transaction is bundled with numerous supporting services, it is often ineffective as a substitute for cash, particularly for small value transactions.

Cash transactions themselves are highly inefficient. Last year for example, Americans executed 300 billion cash transactions for items costing less than $20. Banks and businesses spend over $60 billion annually to move, secure, and account for these transactions. Growing numbers of consumers feel burdened by the inconvenience and risk in carrying cash. Further, it is currently impossible to use cash in the electronic marketplace.

Low value cash and consumer transactions will likely be the heart of electronic commerce and electronic payment systems currently under development target this market.

While not all cash transactions will migrate to electronic transfer, the development of a global network such as the Internet itself will create many new on-line markets. A merchant will be any vendor who has Internet connectivity and offers goods for sale, whether they are durable goods, or information-based products such as reports and software entertainment. A customer will be anyone who subscribes to the Internet and browses the vendor web sites for information or tangible goods.

This will give rise to a new type of payment transaction called a "micropayment." These payments will be of very low value—fractions of a penny in some cases—but executed in very high volumes. Micropayments will purchase many of the new information-based products. Information utilities must be able to bill in precise increments for such services as information retrieval (search), cataloging, archiving, formatting, reproducing in various media, etc.

The many challenges faced by any electronic payment system include security as the paramount requirement. However, in addition to being secure, the successful electronic payment system must protect individual privacy without impeding legitimate inquiries by law enforcement and government agencies. This requires transactional anonymity with an audit trail. Transactions may also be non-appealable, emulating cash transactions.

Electronic payment systems are based on either a credit or a debit payment model. In the debit model, first an account is funded, then purchases are made by drawing down on those funds. In the credit model, the purchase is made in advance of payment as with a conventional credit card.

Electronic payment systems are either on-line or off-line systems. An on-line system is one where the parties to a transaction are joined through a network to a third party and communicate with this third party (server) during the course of the transaction. When transactions are executed on an on-line system, the server immediately records the transaction and updates various databases. It may also initiate funds movements.

In an off-line system, two parties exchange funds without any communication with a bank or other third party during the transaction. Off-line systems normally require hardware devices such as smartcards to provide adequate security. In order to download value (cash) onto the card, or to make a deposit, the card must be connected in some way to an electronic network to communicate with a bank or automated teller service. Until the device that receives a payment communicates with a bank over the network, the transaction is completely undocumented within the banking system.

At the time of this writing, a collection of proposed payment systems for the Internet included about fifty entries. These existing systems can be categorized into the following types: credit card based systems, electronic check systems, electronic coin systems, stored value cards, on-line payment systems, electronic scrip systems, and debit systems. These systems, including their benefits and disadvantages, are summarized here.

Credit Card Based Systems

There are several electronic payment systems that are essentially existing credit card systems adapted for operation over the Internet. The chief technical challenge they face in porting the functionality of the credit card system to the Internet is to securely obtain or transmit a customer's credit card information. As a way to lower overall transaction costs, some credit card systems accumulate customer charges and merchant payments up to a predetermined threshold before sending them out to processing agents.

All electronic payment systems based on the credit card model benefit from the familiarity and name recognition these franchises have carefully built up over many years of operation.

However, given the average charge of about $0.20 plus 2% to 3% transaction fees, most merchants would prefer to do business using an alternate and cheaper, payment transaction scheme.

Credit electronic payment systems are built around the conventional, bundled service credit card transaction processing systems. In the current environment, the only network transaction for which these electronic payment systems are optimized is a merchandise mail order purchase of significant value. Even with complicated cumulative charge and payment schemes, these systems are too costly and inefficient for the vast proliferation of low-value payments, including micropayments, that will be common to electronic commerce.

The privacy scheme for the credit electronic payment systems, in most cases, is much like conventional credit card systems. Except for withholding credit card numbers, merchants have access to the standard customer information. Some of the systems provide authentication using digital signatures.

Electronic Check Systems

There are electronic payment systems that are analogous to paper checks. An electronic check would typically consist of a document, signed by the payor using a certified digital signature key, which lists the information necessary for processing a paper check such as: the payor, the bank of the payor, the account number of the payor, the payee, the amount of the payment, and the date of the payment. The payee verifies the signature on the electronic check and then sends the electronic check to his bank for processing. The bank processing of an electronic check is essentially the same process as that used for paper checks today.

The advantage of electronic checks is that they take advantage of existing bank clearing processes, which reduces development time. In the basic model of electronic check, the payee would take the risk if the electronic check was not good. However, the merchant or payee would have two possible avenues to reduce his risk in the case of an on-line payment. If the bank was on-line, the payee could obtain approval from the bank that the check was good or he could require that the payor obtain a certified check from a bank.

The downside of electronic checks is their relatively high cost. Although they are expected to be considerably cheaper than the credit card based systems, most developers of electronic check systems expect the cost to be in the $0.10 to $0.50 range per electronic check. Part of this cost is because of the necessity of an ACH (automated clearing house) transaction for each interbank check, which costs about $0.15. Another problem with electronic checks is that they do not provide any privacy for the payor. The payee will know identifying information which is tied to the payor.

Electronic Coin Based Systems

There are numerous proposals for electronic payment systems that use electronic coins of fixed amounts as a means of exchange. A customer makes a withdrawal from his bank account and receives electronic coins from the bank. The customer can then use these coins to pay a merchant. The merchant can check the validity of the coins using cryptographic techniques. Then the merchant can deposit the coins into the bank. Some electronic coin systems can be used with a multitude of banks.

An advantage of electronic coins is that a coin can be validated by cryptographic techniques so a merchant can be convinced that the coin is indeed valid. However, the merchant has no way to determine on his own whether the coin has been spent before. In order to determine this, the coin has to be given to the bank, and the bank has to check to see if that coin has been deposited before. Some systems suggest the use of tamper resistant hardware for storing the coins so that the tamper resistance has to be broken in order for the customer to spend a coin more than once.

There are electronic coin based systems that provide a very high degree of anonymity. Even if the banks and merchants pool their information about transactions, the identity of the payor of a particular transaction cannot be determined. Because this degree of anonymity might not be acceptable by some governments, there are electronic coin payment systems in which the identity of payors can be determined by trustees who could be independent of the banks and merchants.

One problem with some electronic coin systems is that a single payment might require the use of multiple coins in order to add up to the correct value.

Electronic coin systems are designed to be used in off-line systems, but they could be used in an on-line system as well. The merchant could just deposit the coins and receive a confirmation of the validity of the coins before providing merchandise.

Digital cash transactions are much like cash transactions. Payments are immediate and non-appealable.

Regardless of the provisions the issuer makes to protect against lost or damaged tokens, anonymity means the consumer will be vulnerable to loss. To protect against fraud and loss, some electronic coin systems serialize the tokens that they issue. If the consumer cannot produce a record of the serial numbers, or if the tokens have already been redeemed by someone else, the consumer has indeed lost the "cash."

Anonymity imposes additional overhead on issuers because they must retain extensive records of serial numbers for tokens they have issued.

Stored Value Cards

Another approach to electronic payments uses devices that store a value on them. The device has a register in it that keeps an accounting of the amount of money stored in the device. A customer connects with a bank through an ATM or equivalent and withdraws money from his bank account and the value of the withdrawal is added to the register. The customer can authorize a movement of funds from his device to another device in the system. During this process, the value on his device is reduced and the value on the other device is increased by the same amount. In some systems, any device can accept payments, while in other systems only specified devices can accept payments.

An advantage of the stored value approach is that it requires little processing at the bank. Transactions can take place with no involvement from the bank.

A serious problem with stored value devices is the possibility that a customer could fraudulently add value to his device. One method for reducing the risk of this is to limit the scope of acceptability of the devices. For example, a metropolitan transit system may provide cards that can only be used in the transit system. Another method would be to make the devices extremely difficult to break into. However, this still leaves the system vulnerable to attack. If these devices were to become widely used, it could become financially profitable for an attacker to break into one or more devices and place some large amount of value into the device. If there was no method built into the system for detecting and recovering from such an attack, then losses could be huge.

There is another type of electronic payment that is strictly an off-line system using tamper resistant trusted devices. In this system, a device would have a signature key authorized by a bank. By taking the device to an ATM, or through some other communication with the bank, the customer can withdraw money from his bank account and the balance would be placed on the device together with an identifying number that is unique to this particular withdrawal. When the customer wants to pay a merchant, the device would use the signature key to sign an order to pay the merchant for a specified amount, the balance on the customer's device would be debited by that amount, and the balance on the merchant's device would be credited by that amount. There could be a multiplicity of balances on the customer's device.

One problem with this system is that it requires the bank to keep all records corresponding to a particular withdrawal until the entire withdrawal has been accounted for. Since the transactions could go to many merchants, all of these records must be held until all of the merchant's devices have been to an ATM.

Another problem with the system is that if a transaction has gone through several hands, then a receiver has to check all signatures to validate the cash.

A further problem with this system is that the privacy of a transaction is protected only by the security of the trusted device. Therefore, if this system were to be adopted to low value payments with a lower security level on the devices, the privacy could be more easily compromised as well.

Electronic Scrip

Electronic scrip refers to a type of electronic currency which has a merchant identified at the time of issuance of the cash and such that the electronic currency can only be spent with that merchant. When a customer identifies a new merchant that he wishes to pay, or if he runs out of scrip with a previous merchant, he obtains scrip from a broker for some specified total amount that can be divided into discrete pieces to pay that particular merchant. The payment to the broker for the scrip could involve another type of electronic payment. The customer can then make payments to the specified merchant until the total is reached or until the customer does not want to make any more payments to that merchant during the current time period, for instance a day. The merchant must deposit the scrip with the broker. The broker then pays the merchant through some other payment mechanism.

Because this system uses some other electronic payment system for the customer to purchase scrip from the broker and for the broker to pay the merchant for redeemed scrip, it will only be beneficial in instances in which a customer has many transactions with a single merchant. In these cases, it is more efficient than other electronic payment systems, because of the reduced computational complexity that is required for a scrip payment.

Debit Systems

Debit systems rely on the existing infrastructure of highly efficient ACHs and ATMs for initial funding. Therefore, they have relatively lower transaction costs as compared to credit systems. Typically, an ATM transaction costs $0.50, or less, and an ACH transaction costs less than $0.15. Only a single transaction is needed to fund an account.

Debit systems execute payment transactions by exchanging electronic tokens. These tokens are digitally signed by a participating bank and delivered to the consumer in exchange for a debit to the consumers checking account. The debited funds are held in an escrow account, so that the amount of digital cash or tokens issued is backed by an equivalent amount of cash.

Debit systems today generally use stronger security and authentication techniques than credit systems. Debit systems may employ public key cryptography schemes for security and a variety of digital signature algorithms for authentication. This level of security allows debit systems to operate freely over open unsecured networks.

Debit systems are an attractive alternative to cash for many reasons. Transactions will occur faster because there is no need to wait for change. Debit systems eliminate the operational costs of handling cash. They improve security and reduce losses because businesses are able to transmit value to their bank at any time instead of having to wait for business hours to deposit cash.

In addition, a key feature of the debit system is anonymity. However, only the payer receives complete anonymity. The payee can always be traced.

It is generally believed that governments and law enforcement agencies will not accept security schemes that do not make provision for a so-called back door. Moreover, it is not clear that customers prefer complete anonymity in place of personalized contact with a merchant and protection against loss. The latter is only possible if records of tokens issued to consumers are kept on file.

Common to all off-line debit systems is the use of proprietary, special purpose hardware, including smartcards and the accompanying readers, wallets and smart phones. Smartcards offer an added degree of freedom in dispensing with cash. A one-on-one transaction can be completed without a computer link provided the necessary hardware is available.

Problems with Existing Proposed Solutions

None of these existing or proposed electronic payment systems provide for payment that is non-appealable, does not need extensive records, is relatively anonymous for the consumer, and has low enough processing cost so that it can adequately deal with micro-payments to individual merchants. As noted, micro-payments are very low-value payments that are likely to occur in high volumes on digital communication networks. For example, on a network such as the Internet, merchants such as stock brokers may wish to sell stock quotes at $0.01 per quote. While the cost per sale item is very low, the number of items sold per day may be very high.

With credit card or check-based payment systems, the recipient and/or the system must assume some credit risk, since the buyer can repudiate or simply become unable to pay. The associated insurance component necessarily raises the cost of the payment service. Consumer anonymity is desirable in view of fears expressed by privacy advocates and others that in the future, it will become possible to collect and analyze huge amounts of data concerning every purchase or road toll payment a person makes, thereby creating potential privacy problems.

A problem with payment systems that make an instantaneous payment to merchants is that if a fraudulent merchant is accepting many fraudulent transactions, he might not be detected until he had already received much money.

For these and other reasons, it is desirable to provide a payment system that is non-appealable, does not need extensive records, is relatively anonymous for the consumer, and would adequately deal with micropayments to individual merchants.

Other desirable aspects of a payment system include high performance, low cost, minimum maintenance, easy scaleabiliy according to volume, significant security with moderated anonymity and strong authentication, standards-based and open architecture and adaptability for anomaly detection for detection of fraud.

SUMMARY OF THE INVENTION

This invention relates to an electronic commerce and transaction system, its components and methods for their use.

In one aspect, the invention is a method of payment in an electronic commerce system wherein customers have accounts with an agent and where each customer shares a respective secret between that customer and the agent. This secret is set up prior to the actual transaction or payment and, in preferred embodiments, is a dynamic secret.

According to the method of this invention, a customer obtains an authenticated quote from a specific merchant, the quote including a specification of goods and a payment amount for those goods. The customer then sends to the agent, in a single authenticated one-pass communication, a payment request message representing a request for payment of the payment amount to the specific merchant along with a unique identification of the customer. The agent, after processing the payment request, issues and sends to the customer, in a single one-pass communication, an authenticated verifiable payment advice message. The issuing by the agent is based only on:

the single communication from the customer to the agent, the secret shared between the customer and the agent and non-cryptographic customer information ("customer status information") and/or non-cryptographic merchant information ("merchant status information") which the agent has.

The customer and merchant status information are referred to collectively herein as "status information."

Upon receipt of the payment advice message, the customer forwards a portion of the payment advice message to the merchant. The merchant then provides the goods to the customer in response to receiving the portion of the payment advice message.

The payment advice indicates that payment has or will be made to the specific merchant.

In preferred embodiments of the invention the secret shared between the customer and the agent is a dynamic secret which changes per transaction based on a previous transaction between the customer and the agent. Preferably the secret is modified based on information generated by the customer in a previous transaction with the merchant. The modification information could be generated by the customer, the agent or both and is provided from the customer to the agent in the payment request message and from the agent to the customer in the payment advice message.

The shared secret is modified based on the current shared secret and on the modification information sent from the customer to the agent and from the agent to the customer. If the agent rejects the customer's payment advice request, the shared secret may still be updated. The choice of whether or not to update the shared secret depends on other implementation choices and on why the request was rejected.

In another aspect, the customer and the merchant generate a specific session key per transaction and the quote from the merchant is authenticated using this key. Preferably the key is generated using a Diffie-Hellman technique.

The goods can be digital goods (which can be supplied electronically) or they can be any other form of goods, including pre-approved financial transactions. Preferably the only representation of the goods to the agent is an irreversible unambiguous function of the quote within the payment request message. By an "unambiguous" function is meant one such that it is computationally infeasible to determine two different inputs to the function that will produce the same output value of the function. By an "irreversible" function is meant one such that given an output of the function it is computationally infeasible to find an input that produced that output.

Using an unambiguous function of the quote prevents a customer or a merchant from having two quotes with the same function value. Using an irreversible function of the quote means that the actual quotes cannot be obtained from the agent, thereby enhancing privacy.

In preferred embodiments the merchant verifies the validity of the received portion of the payment advice message prior to providing the goods to the customer.

In another aspect, this invention is a method of payment in an electronic payment system wherein a plurality of customers have accounts with an agent, each customer sharing a respective secret between that customer and the agent. The customer sends to the agent, in a single authenticated communication, a payment request message for payment of a specific amount to a specific merchant, along with a unique identification of the customer. The agent issues a payment advice message to the customer based only on the payment request message, the secret shared between the customer and the agent and the customer and merchant status information, the payment advice message bearing a verifiable digital signature of the agent over part of its content.

The customer then forwards a portion of the payment advice message to the specific merchant who then provides goods to the customer in response to receiving the portion of the payment advice message. The merchant can verify the validity of the digital signature contained in the received payment advice message portion.

In another aspect, this invention is a method of achieving payment in an electronic payment system wherein a plurality of customers have accounts with an agent and wherein each customer shares a respective secret between that customer and the agent. The invention includes the steps of, by the agent, receiving from a customer a single authenticated communication representing a payment request message. The payment request message includes a request for payment of a specific amount to a specific merchant as well as a unique identifier of the customer. The agent then issues to the customer a payment advice message which bears a verifiable digital signature computed over part of its content, the issuing by the agent being based only on the payment request message, the secret shared between the customer and the agent and on the customer and/or merchant payment information.

In another aspect, the method includes, at a specific merchant, receiving from a customer a portion of a payment advice message issued by the agent, where the payment advice message indicates that payment will be made to the specific merchant, and then the merchant providing goods to the customer in response to receiving the portion of the payment advice message.

In some preferred embodiments the payment advice identifies a quote previously provided by the merchant to the customer, and the goods provided are goods specified in the quote.

In another aspect, this invention is an electronic payment system including an agent, a plurality of merchants, and a plurality of customers having accounts with the agent, where each customer shares a respective secret with the agent. The system includes a mechanism constructed and adapted to send from a customer, in a single authenticated communication to the agent, a payment request message representing an identifier for the customer and a request for payment of a specific amount from the customer to a specific merchant. The system also includes a mechanism constructed and adapted to issue, from the agent to the customer, an authenticated verifiable payment advice message in response to only the payment request message received by the agent, the secret shared between the customer and the agent and customer and/or merchant status information known by the agent.

In some embodiments the system includes a mechanism constructed and adapted to forward a portion of the payment advice from a customer to a merchant and a mechanism constructed and adapted to provide goods from the merchant to the customer in response to receipt of the payment advice.

In yet another aspect, this invention is an agent in an electronic payment system comprising the agent, a plurality of customers and a plurality of merchants, the customers having accounts with the agent and each customer sharing a respective secret with the agent. The agent has a mechanism constructed and adapted to receive, from each customer, a payment request message representing a single authenticated communication comprising along with an identifier for the customer and a request for payment of a specific amount to a specific merchant. The agent also has a mechanism constructed and adapted to issue an authenticated verifiable payment advice message in response to only a received payment message from a customer by the agent, the respective secret shared between the customer and the agent and customer and/or merchant status information known by the agent.

In yet another aspect, this invention is a customer, in an electronic payment system comprising an agent, a plurality of customers and a plurality of merchants, the customers having accounts with the agent and each customer sharing a respective secret with the agent. The customer has a mechanism constructed and adapted to send a payment request message in a single authenticated communication comprising an identifier for the customer and a request for payment of a specific amount to a specific merchant of the plurality of merchants. The customer also has a mechanism constructed and adapted to receive an authenticated verifiable payment advice issued by the agent in response to only a received payment request message from a customer by the agent, the secret shared between the customer and the agent and customer and/or merchant status information known by the agent.

In some embodiments, the customer also has a mechanism constructed and adapted to obtain an authenticated quote from a specific merchant of the plurality of merchants and a mechanism constructed and adapted to forward a portion of the payment advice message to the specific merchant, where the portion of the payment advice message identifies the quote.

In some embodiments the quote specifies goods and the customer includes a mechanism constructed and adapted to receive the specified goods from the specific merchant. In some embodiments, the customer also has a mechanism constructed and adapted to re-forward the portion of the payment advice message to the specific merchant when the goods are not received from the specific merchant because of non-receipt of the payment advice message by the merchant.

In yet another aspect, this invention is a merchant in an electronic payment system comprising an agent, a plurality of customers and a plurality of merchants, the customers each having accounts with the agent and each customer sharing a respective secret with the agent.

The merchant has a mechanism constructed and adapted to provide an authenticated quote to a customer, the quote specifying goods. The merchant also has a mechanism constructed and adapted to receive a verifiable portion of a digitally signed payment advice message issued by the agent in response to only electronic signals representing a received single communication from a customer by the agent, to the secret shared between the customer and the agent and to customer and/or merchant status information known by the agent.

In some embodiments the portion of the payment advice message identifies a function of the goods, and the merchant also has a provider mechanism constructed and adapted to provide the goods to the customer in response to receipt of the portion of the payment advice message.

The provider mechanism can provide for authentication and encryption of portions of the goods which comprise electronic signals.

In another aspect, this invention is a method of payment in an electronic payment system wherein a plurality of customers have accounts with an agent. Each customer shares a respective dynamic secret between that customer and the agent. The method includes obtaining, by a customer, electronic signals representing an authenticated quote from a specific merchant of a plurality of merchants, the quote including a specification of goods and a payment amount for those goods. The customer then sends to the agent a payment request message for payment of the payment amount to the specific merchant and a unique identification of the customer. The agent issuing and sending to the customer electronic signals representing an authenticated verifiable payment advice message, the issuing being based only on the payment request from the customer to the agent and on the dynamic secret shared between the customer and the agent. The customer forwards a portion of the payment advice message to the specific merchant and then the merchant provides the goods to the customer in response to receiving the electronic signals representing the portion of the payment advice message.

In another aspect of this invention, a merchant is unable to associate the origin of any particular transaction with prior transactions from the same customer. This is because the merchant is not provided with information which would enable such an association to be made.

In yet another aspect of this invention, transactions cannot be linked to customers by anyone other than the agent.

In a further aspect, the encrypted session between customer and merchant creates a unique customer/merchant shared secret which acts as the sole authenticated reference for the current transaction.

In still a further aspect, the agent issues the payment message without verifying the quote and the customer does not send the full quote to the agent.

In yet another aspect of this invention, the merchant issues the quote verifiable only by the customer.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which:

FIGS. 4A–4K depict fields in the customer's database;

FIGS. 6A–6C depict fields in the merchant's database; and

FIGS. 7A–7N, 7P and 7Q depict messages passed between parties in the system during its operation.

DETAILED DESCRIPTION OF THE PRESENTLY PREFERRED EXEMPLARY EMBODIMENTS

I. Symbols and Nomenclature

The following symbols and nomenclature are used herein.

| | |
|---|---|
| $\oplus$ | Denotes the logical exclusive-or operator |
| $\|$ | Denotes the bit string concatenation operator |
| ~ | Denotes the logical complement operator ("ones complement") |
| SHA(message) | Denotes the 160-bit result of applying the (revised) Secure Hash Algorithm, SHA-1, to "message". The SHA algorithm is defined in Federal Information Processing Standards (FIPS) Pub. 180 and FIPS Pub. 180-1, the contents of which are hereby incorporated herein by reference. |
| DSA(X,Y) | Denotes Y's DSA signature on the message X. |
| DSAs(X,Y) | Denotes the 's' portion of DSA(X,Y), where computation of DSA(X,Y) includes computation of SHA(X). The DSA algorithm is defined in FIPS 186, the contents of which are hereby incorporated herein by reference. |
| DSAr(X,Y) | Denotes the 'r' portion of DSA(X,Y) |
| Bits(X,O,L) | Denotes the string of L consecutive bits at offset O from the start of X |
| $X_{CTA}$ | Denotes the Diffie-Hellman private key (exponent) of the CTA 102 |
| $X_{MERCHANT}$ | Denotes the Diffie-Hellman private key (exponent) of some merchant |
| $Y_{MERCHANT}$ | Denotes the Diffie-Hellman public key component of some merchant |
| $Y_{CTA}$ | Denotes the Diffie-Hellman public key component of the CTA 102 |

II. Overview

A. Components of the System

Figure 1:
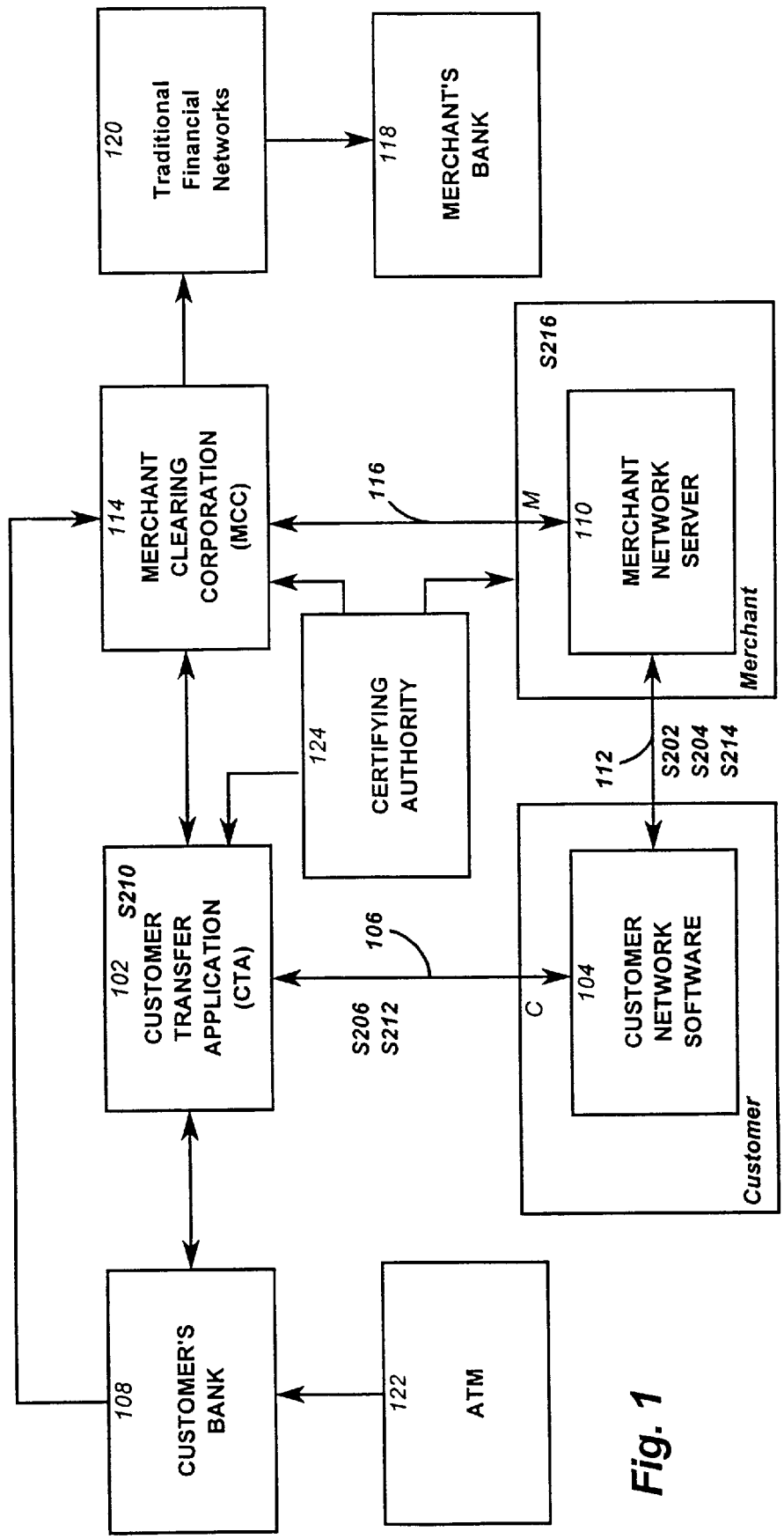
FIG. 1 shows an overview of an electronic commerce system according to the present invention.

An embodiment of the present invention is described with reference to FIG. 1 wherein an electronic commerce system 100 consists of one or more customer transfer applications (CTAs) 102 connectable to customer network software 104 via communications channels 106 which need not be secure. Customer network software 104 is associated with a customer C. In preferred embodiments the system 100 operates on a global computer network such as the Internet and the customer network software 104 is, for example, built into a customer's Internet access/browsing software.

Each customer has a bank 108, to which the CTA 102 is connectable via some standard mechanism such as an automated clearing house (ACH).

Customer network software 104 can also interact with a merchant M via merchant network server (MNS) 110. Interaction between customer C and merchant M, that is, between customer network software 104 and merchant network server 110, is performed via a communications channel 112 which may be insecure.

Merchant M is connectable to merchant clearing corporation (MCC) 114 via a possibly insecure channel 116. The CTA 102 is also connectable to MCC 114.

Merchant M has a bank 118 with which either the MCC 114 or the MCC's designated bank interacts via traditional financial networks 120. The merchant's bank 116 and the customer's bank 108 can be the same bank. The merchant M has an account with the MCC 114. The MCC 114 may designate accounts at one or more banks through which to execute payments to merchant banks 118 and/or to receive payments from customer banks 108, and/or there may be multiple MCCs 114. There may be multiple CTAs 102.

Preferably the CTA 102 is made up of a group of dedicated processors at a secure location. The CTA 102 executes electronic payments from customers to merchants within the system 100, as well as providing customer services such as database searches, records and customer receipts and allocation and/or collection of fees. The CTA 102 may designate an account at one or more banks through which to receive fees from customer banks 108.

The MCC 114, like the CTA 102, is preferably made up of a group of dedicated processors at a secure location. The MCC 114 collects and disperses funds due to merchants, possibly through the MCC's designated bank. The CTA 102 and the MCC 114 are not necessarily autonomous and may share accounts at designated banks.

B. The System Protocol

Figure 2:
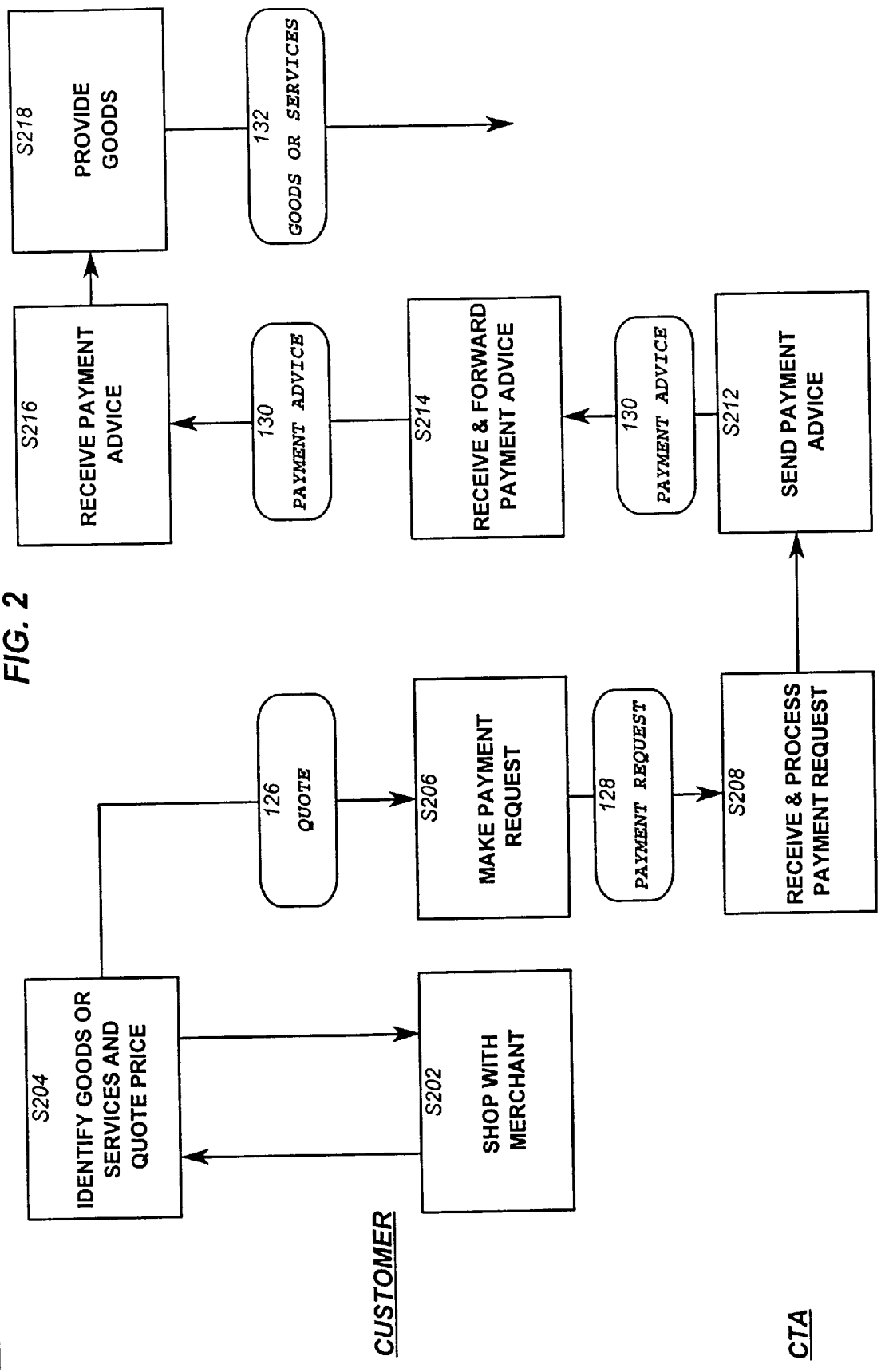
FIG. 2 depicts a flowchart of the operation of the system of FIG. 1.

The electronic transfer system 100 operates according to the following protocol (described with reference to FIGS. 1 and 2) which defines the electronic exchange of messages which effect a payment within the system.

First, in order to access the electronic transfer system 100, a customer C must subscribe to the service and establish an account within a particular CTA 102. This customer account must typically be funded before purchases can be made, for example through ATM 122, although actual funding is outside the scope of the payment system. The customer's bank 108 and the CTA 102 negotiate the availability of funds with respect to customer transactions within the payment system. The customer's bank 108 may send opening balances to the CTA 102 on some regular basis. The customer setup process is described in more detail below.

Having established an account with the system 100, a customer C shops with various merchants over electronic networks such as the Internet using the customer's existing software such as desktop Internet browser software and the like (step S202). A payment sequence begins after the customer C has selected goods for purchase from a merchant M. The merchant's network server 110 sends a digital message, quote 126, to the customer network software 104 which identifies the goods to be purchased and quotes the price for those goods to the customer (step S204). The customer must confirm the desire to execute a payment in the amount quoted in quote 126. This confirmation by the customer triggers the transmission of a digital payment request message 128 from the customer network software 104 to the customer's designated CTA 102 (step S206).

In response to receipt of the customer's digital payment request message 128 (step S208), the CTA 102 processes the request and, if the request is acceptable, executes an "intent to transfer" of funds from the customer C's account to the merchant M's MCC account (step S210). This intent to transfer has the characteristics of an exchange of cash in that it is instantaneous, final and non-appealable. The CTA 102 may perform certain checks during the process which may include a check that the CTA 102 has not been apprised that the designated merchant is not currently in good standing. At some point an actual transfer of funds is executed from the customer's bank 108 to the MCC 114 possibly into an account held by the MCC 114 at a designated bank. These fund transfers may be batched over multiple transactions per customer account and over multiple customer accounts for reasons of efficiency. The customer's bank 108 initiates these funds transfers in response to detailed records and transfer requests it receives from the CTA 102. In a similar manner the MCC 114 may transfer refunds from a merchant's bank 118 to a customer's bank 108.

The CTA 102 returns to the customer network software 104 an authenticated digital payment advice 130 confirming the intent to transfer of funds (step S212). In preferred embodiments, upon receipt of this authenticated digital payment advice 130 by C's customer network software 104 (step S214), the authenticated digital payment advice 130 is automatically forwarded from the customer network software 104 to the merchant's MNS 112 (step S214). The customer can and should also retain a copy of the authenticated digital payment advice 130 for proof of transaction. With respect to record checking and reconciliation of accounts, in the currently preferred embodiment data distinct from the payment advice is actually used to authenticate the transaction status from the CTA 102 to the customer network software 104.

Because the advice is created only after a successful intent to transfer of funds by the CTA 102 (from the customer's CTA account to the merchant's MCC account), a merchant is assured that an authenticated payment advice which the merchant successfully verifies represents a real payment into the merchant's system account. Accordingly, once an authenticated payment advice 130 is received and successfully verified by MNS 112 (step S216), the merchant M is then responsible for providing to the customer C (step S218) the goods or services 132 indicated in the original quote 126 (step S204).

The goods and services 132 can be anything that can be arranged for sale over a network such as the Internet. In one application, the goods and services 132 will be very low-cost items for which micropayments will be made. For example, the goods and services 132 could include a page of text, a digital image, digital sound, access to an on-line search mechanism and the like. Digital goods are deliverable over the Internet, while hard goods are delivered via conventional means to an address which was possibly indicated to the merchant by the customer during the quote consideration process.

Payment records are forwarded routinely (e.g., daily) from the CTA 102 to the Merchant Clearing Corporation (MCC) 114 which provides a clearinghouse to manage merchant accounts. Merchants periodically receive the proceeds of all system payments by direct deposit from the MCC 114, or through an intermediary such as a bank designated by the MCC 114, into an account at a bank of their choice (merchant's bank 118).

III. Detailed Description of System Components

A. Description of Customer

Figure 3:
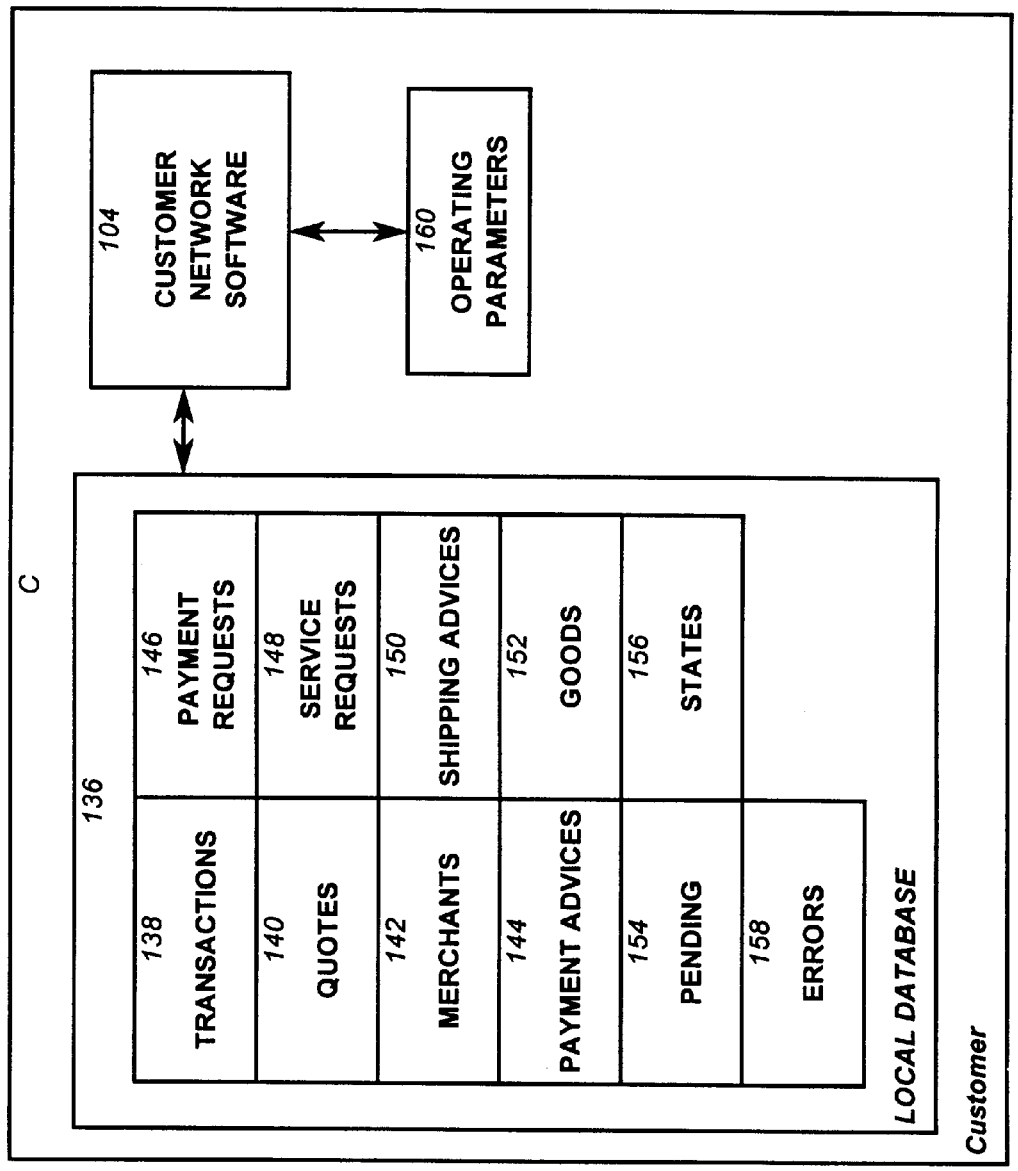
FIG. 3 is a more detailed depiction of a customer of the system of FIG. 1.

Customer C is described in more detail with reference to FIG. 3. As noted above, customer C has customer network software 104 which is connectable to a network such as the Internet. Preferably that customer network software 104 is implemented as an applet (customer applet) in the customer's network browsing application.

1. Customer Network Software Database

The customer network software 104 maintains a local database 136, the primary function of which is to permit the customer to reconcile his records with those of the CTA 102. The database 136 is organized according to a relational model and contains the following tables (each table is described in detail below):

| | |
|---|---|
| 1 | Transactions 138 |
| 2 | Quotes 140 |
| 3 | Merchants 142 |
| 4 | Payment Advices 144 |
| 5 | Payment Requests 146 |
| 6 | Service Requests 148 |
| 7 | Shipping Advices 150 |
| 8 | Goods 152 |
| 9 | Pending 154 |
| 10 | States 156 |
| 11 | Errors 158 |

The customer network software 104 also maintains local operating parameters 160 which are also described in detail below.

The Transactions table 138 provides a short synopsis of every transaction which includes the CTA 102 that may affect the customer's balance. Each row in the table contains the following fields (FIG. 4A):

| | |
|---|---|
| PCSEQUENCE | sequence number assigned by the customer network software 104 |
| CTRANS | customer transaction number. |
| TRANSTYPE | type of transaction (explained below), one of "PMT", "REF", "FUNDING", "EVIDENCE", "STATEMENT". |
| MID | merchant identifier if applicable, otherwise zero. |
| MTRANS | merchant transaction identifier if applicable, otherwise zero. |
| DATE | date of transaction. |
| TIME | time of transaction. |
| AMOUNT | amount of transaction. |
| BALANCE | balance of the customer's account after the transaction. |

The PCSEQUENCE field of the Transactions table 138 uniquely identifies the transaction to the customer network software 104. CTRANS is shared between the customer network software 104 and the CTA 102. The same value of CTRANS may appear in multiple rows in the Transactions table 138, for example, in cases where the CTA 102 does not increment the value of CTRANS.

The Quotes table 140 (FIG. 4B) stores the merchant quote for every item the customer has chosen to buy using his system account. Each row in the Quotes table 140 contains the following fields:

| | |
|---|---|
| MID | merchant identifier if applicable, otherwise zero. |
| MTRANS | merchant transaction identifier if applicable, otherwise zerq. |
| QUOTE | the complete text of the quote as prepared by the merchant. |
| RETAIN160 | a 160-bit segment of the Diffie-Hellman payment transaction key shared between the merchant and customer. |
| PI NUMBER | a counter value which indicates the number of times Previous Transaction Mode has been executed with respect to this transaction |

The Merchants table 142 (FIG. 4C) stores information about merchants from whom the customer has bought goods with his system account. Each row in the table contains the following fields:

| MID    | merchant identifier if applicable, otherwise zera. |
|--------|----------------------------------------------------|
| MNAME  | merchant name.                                     |
| MADDR1 | merchant address line 1.                           |
| MADDR2 | merchant address line 2.                           |
| MADDR3 | merchant address line 3.                           |

The Payment Advices table 144 (FIG. 4D) stores the complete text of every merchant's payment advice message transmitted from CTA 102 to a merchant M through the customer's computer. Each row in the Payment Advices table 144 contains the following fields:

| CTRANS  | customer transaction number.                             |
|---------|----------------------------------------------------------|
| MID     | merchant identifier if applicable, otherwise zero.       |
| MTRANS  | merchant transaction identifier if applicable, otherwise zero. |
| PADVICE | the complete text of the merchant's payment advice message. |

The Payment Requests table 146 (FIG. 4E) temporarily stores the complete text of the last payment request message transmitted to the CTA 102 from the customer C. The Payment Requests table 146 exists only so that a payment request message may be retransmitted to the CTA 102 in the event of communications or system failure. As soon as the response to a request message is successfully received or the final allowed request attempt has failed, the single row of this table 146 is overwritten. The single row of the Payment Request Table 146 contains the following fields:

| CTRANS   | customer transaction number.                   |
|----------|------------------------------------------------|
| PREQUEST | the complete text of the payment request message. |

The Service Requests table 148 (FIG. 4F) temporarily stores the complete text of the last service request message transmitted to the CTA 102. Like the Payment Requests Table 146, the Service Requests table 148 exists only so that a service request message may be retransmitted to the CTA 102 in the event of communications or system failure. As soon as the response to a service request message is successfully received or the final allowed service request attempt has failed, the single row of this table is overwritten. The single row of the Service Requests Table 146 contains the following fields:

| CTRANS   | customer transaction number.                   |
|----------|------------------------------------------------|
| SREQUEST | the complete text of the service request message. |

The Shipping Advices table 150 (FIG. 4G) stores the complete text of every shipping advice transmitted from a merchant to the customer C. Each row in the Shipping Advices table 150 contains the following fields:

| CTRANS  | customer transaction number.                             |
|---------|----------------------------------------------------------|
| MID     | merchant identifier if applicable, otherwise zero.       |
| MTRANS  | merchant transaction identifier if applicable, otherwise zero. |
| SADVICE | the complete text of the shipping advice.                |

The Goods table 152 (FIG. 4H) stores information about every purchase of electronic goods made by the customer C. The Goods table 152 does not store information about pending non-electronic goods shipments. The Goods table 152 is used in conjunction with the shipping advice to insure that the customer receives the goods for which he has paid. Each row in the Goods table 152 contains the following fields:

| CTRANS   | customer transaction number.                                          |
|----------|-----------------------------------------------------------------------|
| FILENAME | name of the file to contain the electronic goods on the customer's computer. |
| CHUNKS   | segments required to transmit the goods from merchant to customer.    |
| LAST     | last segment transmitted successfully from merchant to customer.      |

The Pending table 154 (FIG. 4I) stores information about statements, refunds, funding information and external evidence (described below) that have been requested by the customer C but have not yet been received. These transactions are described below. In addition, some quantities related to the pay/service request CTA-customer Diffie-Hellman session key and the merchant-customer Diffie-Hellman session key must also be held temporarily in the Pending table 154. The Pending table 154 contains the following fields:

| CTRANS     | customer transaction number                                           |
|------------|-----------------------------------------------------------------------|
| DELIVERED  | Boolean indication of whether or not the information has been received. |
| MAGICNO    | unique number assigned by the CTA 102 to this request for information. |
| DECRYPTKEY | a forty-bit key used in a bulk cipher algorithm to decrypt the data.  |
| AUTHKEY    | a 320-bit key used to verify the authenticity of the received information. |
| CTABITS1   | 160 bits of the CTA's Diffie-Hellman session key starting at bit 448. |
| CTABITS2   | 160 bits of CTA's Diffie-Hellman session key starting at bit 608.     |
| MERBITS1   | 160 bits of the merchant's Diffie-Hellman session key starting at bit 320. |
| MERBITS2   | 160 bits of the merchant's Diffie-Hellman session key starting at bit 480. |
| MERBITS3   | 40 bits of the merchant's Diffie-Hellman session key starting at bit 640. |

Because of the sensitive nature of the CTA and merchant Diffie-Hellman session keys, the five fields above which are derived from these keys (CTABITS1–2 and MERBITS1–3) should be overwritten at the earliest moment at which they are no longer needed.

The State table 156 (FIG. 4J) stores information about the current state of every pending transaction. It is used for recovery in the event that a transaction is not completed in one session. Each row in the State table 156 contains the following fields:

| CTRANS | customer transaction number. |
|---|---|
| ADD | a quantity that is used to adjust the PIN transmitted to the CTA 102. |
| RANDOM | a quantity that adjusts ADD. |
| RETRANS | the number of retransmissions left until the current transaction is aborted. |
| NEXTTRANS | the number to be assigned to the next transaction, initially one. |
| STATE | the most recent transaction state. |
| STATUS | the Boolean status of a transaction within a state. |
| TEXT | free form text associated with the state. |

The transaction states are predefined as follows:

| State Value | Meaning |
|---|---|
| 10 | customer confirms the purchase |
| 20 | merchany authenticated by customer's computer |
| 30 | customer computer composed payment request |
| 40 | customer computer sent payment request to CTA 102 |
| 50 | payment advice sent by the CTA 102 to the customer computer |
| 60 | customer computer sends payment advice to merchant |
| 70 | merchant responds with a shipping advice |
| 80 | merchant begins sending electronic goods to customer computer |
| 90 | transaction completed |
| 100 | transaction aborted |

The Errors table 158 (FIG. 4K) stores information about errors that may have occurred while processing transactions. Each row in the Errors table 158 contains the following fields:

| CTRANS | customer transaction number if applicable, otherwise zero. |
|---|---|
| DATE | date of error. |
| TIME | time of error. |
| SEVERITY | severity of the error. |
| MSGNUM | unique number assigned to the error. |
| MSGTEXT | text associated with the error. |
| Possible SEYERITY codes are: | |
| F | fatal, the session is aborted; |
| E | error, the transaction is aborted; |
| W | warning; and |
| I | informational. |

Certain of these tables in the customer's local database 136 contain sensitive data and may be encrypted. If necessary a forty-bit cryptographic key may be embedded into the customer network software 104 executable at setup time. This key and a weak bulk cipher encryption algorithm may be used to inhibit snooping of the customer local database 136 and other customer information, e.g., operating parameters 160.

B. Description of a Merchant

Figure 5:
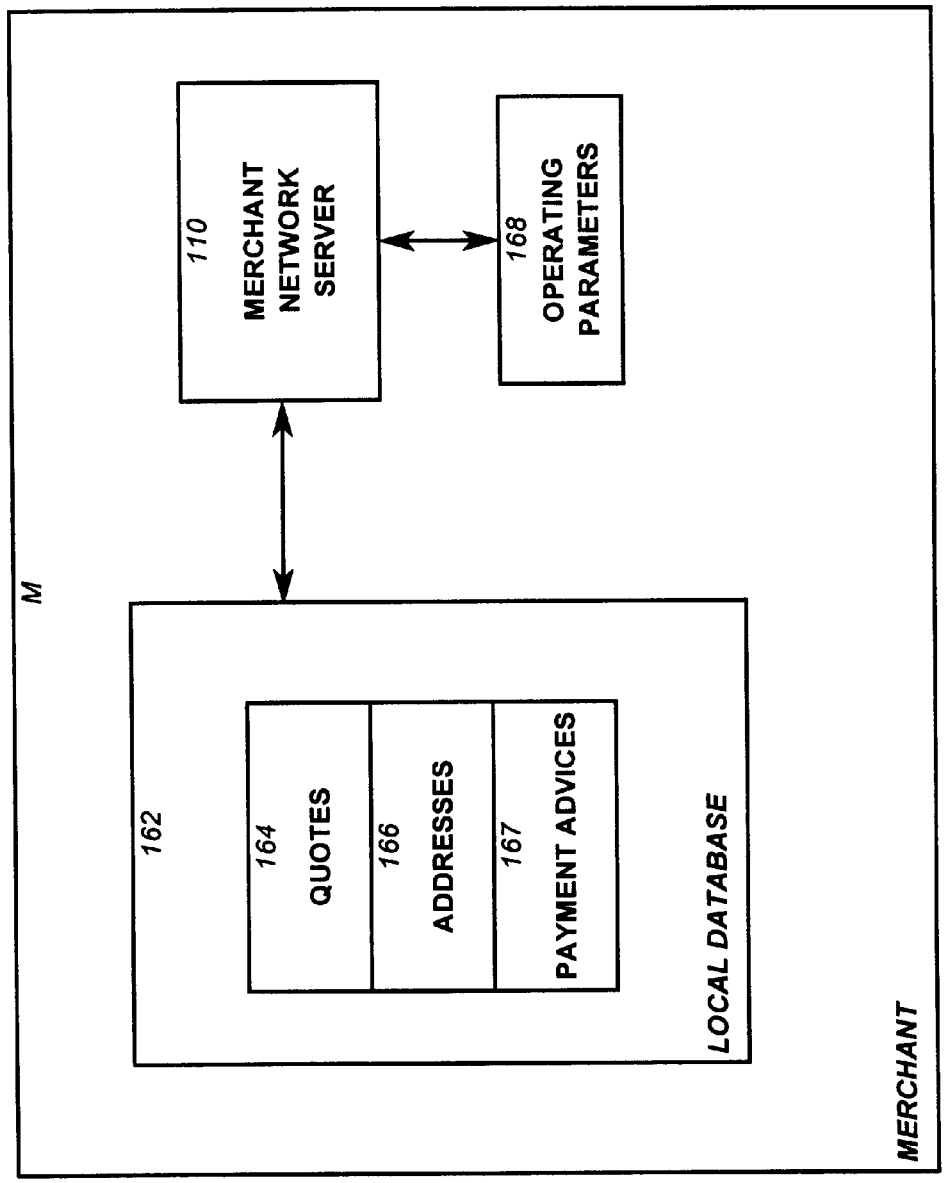
FIG. 5 is a more detailed depiction of a merchant of the system of FIG. 1.

Merchant M is described in more detail with reference to FIG. 5. As noted above, merchant M has a merchant network server 110 which is connectable to a network such as the Internet.

1. Merchant Network Server Database

The merchant network server 110 maintains a local database 162 organized according to a relational model. The merchant's local database 162 contains the following tables:

| 1 | Quotes 164 |
|---|---|
| 2 | Addresses 166 |
| 3 | Payment Advices 167 |

The Quotes table 164 stores the merchant quote for every item a customer has chosen to buy using his account. Each row in the Quotes table 164 (FIG. 6A) contains the following fields:

| MTRANS | merchant transaction identifier. |
|---|---|
| QUOTE | the complete text of the quote as prepared by the merchant. |
| RETAIN160 | a 160-bit segment of the Diffie-Hellman payment transaction key, D-H $Key_{MERCHANT}$, shared between the merchant and customer. |
| PI NUMBER | a counter value which indicates the highest-valued countersetting within an intact execution of Previous Transaction Mode with respect to this transaction. |

In addition, Bits (D–H $Key_{MERCHANT}$, 320, 360), that is, the string of 360 consecutive bits of D–H $Key_{MERCHANT}$, starting at offset 320, are saved until the conclusion of processing of a transaction.

The Addresses table 166 (FIG. 6B) stores name and address information for every transaction for which the merchant requires that the customer reveal his identity. The Address table 166 contains the following fields:

| CUSTNAME | customer name |
|---|---|
| CUSTADDR1 | customer address, line 1. |
| CUSTADDR2 | customer address, line 2. |
| CUSTADDR3 | customer address, line 3. |

The Payment Advices Table 167 (FIG. 6C) stores merchant transaction identifier and merchant's payment advice message information for every transaction for which a valid merchant's payment advice message has been received. For this purpose a merchant's payment advice message is valid if it can be proved to have been authenticated by the CTA and intended for that merchant, independent of the other contents of the message. This table is optional in the sense that its entries would only be used for potential dispute resolution.

The merchant network server 110 also maintains local operating parameters 168 which are also described in detail below.

C. The CTA Databases

The CTA 102 maintains a number of databases with customer account information. In particular, the CTA maintains for each customer, based on the customer's system account number, the number of the last transaction for that customer and the value of PIN* for the customer.

IV. Version Control

Each executable component which participates in transactions, including the customer network software 104 and the merchant network server 110, has an embedded version number. Every message transmitted between executable components contains both the software version of the sender and the oldest version of the receiver with which it is compatible. It is the responsibility of the receiver to compare its version against that in the message. Upon receipt of an unacceptable message the receiver responds with an incompatible version message.

V. Cross Platform Note

Executable components that participate in system transactions run on hardware from many different manufacturers. In order easily to accommodate the differences every message transmitted from one component to another will be encoded in Base64 format by the sender. This encoding scheme translates all data to seven bit ASCII characters. On the World Wide Web, a content encoding type is intentionally not specified. In all cases it is the responsibility of the receiving component, rather than an associated Web browser to decode the message.

In some embodiments, messages are encoded with one extra byte per element so as to ensure that every string in a message is terminated with a null byte.

VI. Assumptions

Messages transmitted between customer network software 104 and the CTA 102 are authenticated by means of a Diffie-Hellman key exchange mechanism. Messages exchanged between customer network software 104 and merchants are authenticated by the same kind of Diffie-Hellman key exchange as is used between the customer and the CTA 102.

The merchant network server 110 uses a fixed Diffie-Hellman public key component.

The Diffie-Hellman system parameters, p and g described below, are the same for exchanges between customer and merchant and between customer and CTA 102.

The CTA 102 uses a fixed Diffie-Hellman public key component. The customer network software 104 uses a randomly generated exponent and Diffie-Hellman public key component pair which is used within a single transaction.

The randomly generated Diffie-Hellman exponent and public key component pair used by the customer network software 104 to communicate with the merchant is the same as that used to communicate with the CTA 102 for the same transaction. This dual use of the exponent is for efficiency only and should be considered optional.

As stated in the Digital Signature Standard FIPS document, DSA parameters can be generated in such a way as to allow mutually distrustful entities to check that the system parameters were not generated in a way which would allow the party who generated the parameters some advantage, with respect to cryptanalysis, over the other users of those parameters. The Diffie-Hellman parameters can be generated by a similar procedure. A system administrator specifies both the DSA and Diffie-Hellman parameter generation procedures. These procedures need not be implemented within either the customer or merchant software.

The certification authority 124 (CA) (see FIG. 1) issues an X.509 certificate to each merchant, which includes the merchant's Diffie-Hellman public key component. The notion of digital certificates issued by certifying authorities (public key certificates) is well-known and is described in various standards, including CCITT Recommendation X.509. The Directory—Authentication Framework, November 1988, which is hereby incorporated herein by reference. Although X.509 certificates are specified within the preferred embodiment, other certificate structures or formats may be used without sacrificing interoperability, since these certificates are used only internally to the payment system.

The merchant network server 110 also needs to access the Diffie-Hellman parameters as certified by the CA 124. These parameters are used to compute the merchant's Diffie-Hellman public key component from the private exponent. The private exponent is initially generated by the merchant software. The merchant's X.509 certificate need not include the Diffie-Hellman system parameters, since these are accessible to the customer via the CTA 102 Diffie-Hellman certificate. Neither the customer nor merchant DSA public key need be certified. The CA 124 also issues X.509 certificates to the CTA 102 and the merchant clearing corporation 114. The CTA 102 is issued a Diffie-Hellman and a DSA certificate. The MCC 114 is issued a DSA certificate.

The public keys of the CA 124 and the CTA 102 may be embedded in the customer network software 104 executable. Also embedded within the customer network software 104 executable may be the two sets of system parameters:

1. DSA parameters corresponding to the CA 124, CTA 102, MCC 114, merchant, and customer signatures; and
2. Diffie-Hellman parameters for use between the customer and CTA 102, and between the customer and merchant.

The customer network software 104 does not require access to the CTA 102 DSA public key for routine processing. The CTA 102 keys, the merchants' Diffie-Hellman keys, and the Diffie-Hellman parameters are verified by means of the certificates issued by the CA 124. The verification is done by a software setup program which creates the executable. The CA public DSA key and the DSA parameters may be fixed for the lifetime of the software edition.

The public DSA keys of the CA 124, the MCC 114, and the CTA 102 may be embedded in the merchant network server executable. Also embedded within the merchant network server executable may be the two sets of system parameters:

1. DSA parameters corresponding to CA 124, CTA 102, MCC 114, merchant M, and customer C signatures; and Diffie-Hellman parameters for use between the customer and CTA 102, and between the customer and merchant.

To provide for non-repudiation, time-stamped versions of the CA DSA public key, the DSA and Diffie-Hellman system parameters and the hashing and signature verification algorithms may be registered with a third-party disinterested agent. The registration agent may also be able to provide the parameter generation protocols and seed material. In particular, given this information, an arbitrator would be able to check the validity of the signatures presented to it for dispute resolution.

The customer network software 104 can be enabled to output data which has been hashed and signed by the CTA 102, as well as the corresponding CTA 102 DSA signature(s) and the CA-certification of the appropriate CTA 102 DSA public key(s). The customer network software 104 must also be able to output complete merchant quote information as saved in the reconciliation database.

All public keys are 768 bits long. These include a DSA key for the CA 124, DSA and Diffie-Hellman keys for the CTA 102, DSA and Diffie-Hellman keys for the merchant, a DSA key for the MCC 114, and a DSA key for the customer. The merchant and customer DSA keys are not used in communications between the customer and merchant.

All security-related quantities, especially private keys, should be held in memory for as short a time as is possible. After their use they should be overwritten to prevent compromise. They should not be written to the hard drive unless and until required, and should be overwritten on disk as soon as feasible.

The merchant network server 110 can be enabled to output data which has been hashed and signed by the CTA 102 and/or MCC 114, as well as the corresponding CTA/MCC DSA signature(s) and the CA-certification of the appropriate CTA 102/MCC 114 DSA public key(s). The merchant network server 110 must also be able to output complete merchant quote information as saved in the merchant database 162. More particularly, the seller applet (the merchant network server 110) may be able to output information from the local data bases to a disk file in a format that is readable by common spreadsheet or database programs (for example, comma delimited ASCII dBase II), where data for dispute resolution consists of two classes: (1) Merchant-MCC/CTA disputes and (2) Merchant-Customer disputes. For class (1) disputes, the statements which have been hashed and signed by the MCC, as well as the corresponding payment advice from the local data base which is signed by the CTA may be written to a disk file. The CA-certification of the appropriate CTA/MCC DSA public key(s) provides solid evidence. For class (2) disputes, the merchant can output the payment advice and CTA signature from the local data base.

VII. Setup and Initialization

Recall that messages transmitted between customer network software 104 and the CTA 102 are authenticated by means of a Diffie-Hellman key exchange mechanism and that the merchant network server 110 uses a fixed Diffie-Hellman public key component. The Diffie-Hellman system parameters, p and g described below, are the same for exchanges between customer and merchant and between customer and CTA 102.

To set up a key pair, two Diffie-Hellman parameters p and g are generated in advance by the CTA 102. These parameters are public. The first parameter, p, is a prime number of exactly 768 bits, (that is, less than $2^{768}$ and greater than $2^{767}$) with the property that $$p-1=2\ p'$$

where p' is prime.

The second parameter, g, is chosen as an integer between 2 and p−1 with the following two properties:

$g^2$ is not congruent to 1 modulo p $g^{(p-1)/2}$ is not congruent to 1 modulo p The CTA 102 picks a random 160-bit exponent denoted by $X_{CTA}$. It then computes $$Y_{CTA}=g^{Xcta}\ \text{modulo p.}$$

The value $Y_{CTA}$ then becomes the public key component of the CTA 102 for Diffie-Hellman exchanges. The value of $X_{CTA}$ must be held securely by the CTA 102.

The values of g, p, and $Y_{CTA}$ (the CTA's public key component) are contained in a digital certificate issued to the CTA 102 and signed by the CA 124. The certificate is transmitted initially to the customer as part of the customer setup procedure which is addressed below.

For each customer, the CTA 102 maintains the current value of a Transaction-PIN quantity called PIN* (described below). The value of PIN* is initialized to the Logon-PIN quantity called PIN, which is assigned to the customer via an out-of-band procedure.

The quantity ADD is set to zero each time the customer indicates that he has been assigned a new value of PIN. Customer PINs are assigned during calls to a voice response unit (VRU) both at customer setup time and in response to loss of PIN* synchronization between the customer and CTA 102 thereafter. Customer calls to the VRU are authenticated by means of a long-term PIN and a customer subscriber identifier (SID) which appears on a card that is mailed to customers at the time they open their accounts.

The DSA parameters are generated in advance, and are public.

1. Setup of Merchant

As with the CTA 102, two Diffie-Hellman parameters p and g are generated in advance. They are public, and are available to the merchant as certified by the CA 124. The first parameter, p, is a prime number of exactly 768 bits, (that is, less than $2^{768}$ and greater than $2^{767}$) with the property that $$p-1=2\ p'$$

where p' is prime.

The second parameter, g, is chosen as an integer between 2 and p−1. It must have the following two properties:

$g^2$ is not congruent to 1 modulo p $g^{(p-1)/2}$ is not congruent to 1 modulo p The merchant picks a random 160-bit exponent which is denoted by $X_{MERCHANT}$. It then computes $$Y_{MERCHANT}=g^{Xmerchant}\ \text{modulo p.}$$

The value of $Y_{MERCHANT}$ then becomes the public key component of the merchant for Diffie-Hellman exchanges. Note that the value of $X_{MERCHANT}$ must be held securely by the merchant, and $Y_{MERCHANT}$ must be transmitted securely to the MCC 114, so as not to allow undetected substitution.

The value of $Y_{MERCHANT}$ is contained in a certificate issued to the merchant and DSA-signed by the CA 124. The certificate is transmitted initially as part of the merchant setup procedure which is addressed separately. As part of merchant setup, the merchant network server 110 can check that the received certificate includes the correct merchant information and merchant public key, and that the CA signature verifies. The DSA parameters are generated in advance, and are public.

The merchant private DSA key is randomly generated as part of the customer setup procedure. The corresponding public DSA key is securely transmitted to the MCC 114, so as not to allow undetected substitution.

The generation of the merchant DSA private key relies on the DSA system parameter q. The computation of the merchant DSA public key relies on the private DSA key and on the DSA system parameters $g_{DSA}$ and $p_{DSA}$.

2. Initial Customer Setup

Prior to describing the operation of the system 100 in more detail, set up of customer and merchant accounts with the system is described. At the end of the initial customer setup process the customer has certain cryptographic keys and other values stored on his computer.

A customer C sets up a system account at a participating bank 108 and is given a unique system account number.

The customer network software 104 is then delivered on a bank-provided diskette or is downloaded from a system distribution server over the public telephone network. A sixteen-digit long-term PIN is either delivered with the diskette or is mailed later by the bank 108 with the public key, described below. The long-term PIN is used for the distribution site's voice response unit (VRU).

The customer then runs a setup program on the customer's computer. The program brands the software to this particular customer and generates a public/private key pair.

The private key is used by the customer to generate digital signatures. The public key is used by the CTA 102 to verify digital signatures from the customer.

The customer private DSA key is randomly generated as part of the customer setup procedure. The corresponding public DSA key is securely transmitted to the CTA 102, so as not to allow undetected substitution. The generation of the customer DSA private key relies on the DSA system parameter q. The computation of the customer DSA public key relies on the private DSA key and on the DSA system parameters $g_{DSA}$ and $P_{DSA}$.

In addition the customer is assigned a subscriber identifier and an account identifier. These two quantities taken together uniquely identify the customer. In any transaction between the customer and the CTA 102 the two quantities are always transmitted together and encrypted under Diffie-Hellman.

A supported Web browser is configured so that it routes messages with MIME types of "ec/quote" to the customer network software 104.

The customer software uploads the public key to the system distribution server. The customer is also prompted to enter the customer's bank system account number. The distribution site and server are not part of the CTA 102. The server is preferably a direct-dial host. At end-of-day the distribution server sends a batch message to the CTA 102 listing all newly applied-for account numbers. The CTA 102 creates an internal account flagged inactive and sends an out-of-band batch message to the bank 108 listing all accounts to be approved.

The bank 108 returns to the customer a physical form (typically a fax or postal letter) containing the customer's hashed public key. The customer compares the delivered hashed public key to a readable version of the hashed public key already stored in the customer's software. The two hashes must match in order to be valid. The customer signs the physical form and returns it through regular postal mail to the bank 108. The bank 108 performs a physical signature verification, which binds the public key to the customer's identity.

Routinely, e.g., nightly, the bank 108 sends a batch transfer of all verified, rejected, and revoked accounts to the CTA 102. Upon receipt of the verification message, the CTA 102 binds the public key to the customer's account number and activates the customer's account.

Next the customer telephones the PIN server. A voice response unit at the PIN server requests the customer's long-term PIN and subscriber identifier and responds with a seven-character logon PIN. The customer uses the logon PIN each time the customer authenticates a transaction to the CTA 102.

3. Merchant Initialization

Initial merchant setup is as follows:

System merchant software enabling merchants to offer goods for purchase by system customers is delivered on diskette. The merchant's identity is verified when the merchant account is activated.

Like the customer software, the merchant software setup program brands the software for use by a particular merchant. Unlike the customer, however, the merchant is issued a digital certificate signed by the MCC 114. This certificate conveys the MCC's trust in the identity of the merchant.

The certificate includes a Diffie-Hellman key used to authenticate communications between merchant and customer.

At initialization, the merchant network server 110 determines its version number, the DSA parameters, and the DSA public key of the CA 124. These quantities are embedded (hardwired) in the executable version of the merchant network server software. This guarantees that the merchant network server stops functioning if the CA 124 is issued a new key/parameters or if the merchant's network server becomes stale. The merchant network server 110 then verifies the CTA's DSA certificate and the MCC DSA certificate with the CA's public key. If the certificates are valid then the CTA's public DSA key and the MCC public DSA key are saved. Otherwise the merchant network server 110 logs the error and exits. The certified Diffie-Hellman parameters are also saved, if they verify correctly. If the system includes multiple CTAs and/or MCCs, the merchant network server 110 would hold multiple public keys.

4. Customer Initialization

Each time the customer network software 104 is launched it will ask the customer for his seven character PIN which will be stored in memory while the program is executing. The PIN must be reentered after some number of transactions have been completed, after some amount of goods have been bought, after some amount of time has elapsed or after some combination of the foregoing. In some embodiments the customer will be asked to enter his PIN every time he makes a purchase or requests information from the CTA 102.

VII. Detailed Operational Description

A detailed description of the operation of the present invention is now given.

1. Customer Shops with Merchant

First the customer shops with a merchant (step S202), identifies goods or services and receives a quote 126 (FIG. 7A) from the merchant (step S204). In operation of the system, when the customer clicks a "Buy" button on a merchant's Web page, the merchant transmits the quote 126 which includes a merchant certificate. The customer's Web browser interprets the message type and activates the customer network software 104 to process the quote.

An example of a quote message 126 is shown in FIG. 7A and includes "Merchant ID," a unique merchant identifier, "Merchant Transaction ID," a unique merchant-assigned transaction identifier, an indication of whether the customer's address is required, a transaction summary (for example, "Two pairs of jeans @ $29.95 each"), the number of items quoted, an array for description of each item quoted, arrays with corresponding item quantities and costs, a quote subtotal, additional costs, and a quote total. Other fields include one for additional information, the currency for the quote (e.g., USD), and an indication of whether or not the merchant allows refunds.

The quote 126 also includes the time of the offer (in the quote) and an expiration time for the offer. The quote has two URLs, a key exchange URL and a payment URL. Finally, the quote includes the merchant's certificate.

The customer views the quote information in a dialogue box. The customer's software has extracted the merchant's Diffie-Hellman system parameters initially sent by the CTA 102 to both merchant and customer when they set up their software. If the customer elects to confirm the quote, the customer network software 104 enters into a Diffie-Hellman key exchange based on those mutual system parameters to authenticate the origin and integrity of the merchant quote and the customer information.

If the customer wants physical goods, the customer is prompted to enter the appropriate name and address. This information is encrypted and sent to the merchant. If the customer wants information (digital) goods, the customer's identity remains anonymous to the merchant.

The Diffie-Hellman key exchange between the customer and the merchant generates a shared secret (described in detail below). The shared secret is a long number linking the merchant's quote and the CTA's payment advice (described later). The secret is used by the merchant to encrypt digital goods.

Because the shared secret has an element of randomness and is unique to a transaction, even if it were possible for an adversary to determine this number, it would be of no use in attacking future transactions. If, for any reason, the Diffie-Hellman key exchange fails, the purchase is aborted.

The customer network software 104 prompts the customer to enter the logon PIN. The logon PIN is never written to the customer's hard disk. The logon PIN is verified later in the transaction process by the CTA 102. The PIN resides only in memory in an attempt to make its compromise difficult.

The customer network software 104 uses the logon PIN as part of a function generating a per transaction PIN. Each transaction has a unique transaction PIN, modified on-the-fly by an unpredictable random number securely delivered by the CTA 102 and by a value randomly generated and sent encrypted by the customer network software 104. The transaction PIN is hashed and encrypted using the SHA-1 and the Diffie-Hellman technique and then the thus processed PIN is transmitted to the CTA 102 to enable the next step of communications.

2. Customer Gets QUOTE from Merchant

Each merchant maintains a page on the network on which goods are offered for sale. The customer uses a supported browser to view an HTML form which resides on the Web server belonging to a merchant who offers goods for sale. The customer clicks a "BUY" button, in response to which the merchant server composes a quote message 124 and encodes it in base 64. The HTTP content type of the quote 126 is "ec/quote". Content encoding is intentionally not specified so that the browser passes the customer network software 104 character data rather than binary. The browser then decodes the quote message. The format of the quote message 126 is shown in FIG. 7A and was described above. The quote must contain the merchant's Diffie-Hellman certificate and must uniquely identify a single transaction ("Merchant Transaction ID").

The customer's browser receives the message and routes it to the customer network software 104.

The customer network software 104 decodes the quote message from Base 64 to binary, verifies the merchant's Diffie-Hellman certificate with the CA's public key and, if successful, then presents all pertinent information to the customer. If the merchant's certificate can not be verified then an entry is written to the customer's transaction log and the customer is informed of the failure.

The customer must either confirm or cancel the purchase. If the purchase is canceled then no further processing is required. If the purchase is confirmed then the customer network software 104 generates 160 bits of randomness, $R_c$, using some well-known approach. Next the customer network software 104 computes the customer's Diffie-Hellman public key component, Z:

$$Z = g^{Rc} \text{ modulo } p$$

The customer network software 104 then computes the Diffie-Hellman transaction key that it shares with the merchant:

$$\text{D-H Key}_{MERCHANT} = Y_{MERCHANT}^{Rc} \text{ modulo } p,$$

where $$Y_{MERCHANT} = g^{Xmerchant} \text{ modulo } p$$

This is the same as $(g^{Xmerchant})^{Rc}$ modulo p which is the same as $(g^{Rc})^{Xmerchant}$ modulo p which is the same as $Z^{Xmerchant}$ modulo p. To reiterate, $$Y_{MERCHANT}^{Rc} = Z^{Xmerchant} \text{ modulo } p$$

This allows the merchant and the customer to hide D-H Key$_{MERCHANT}$ from others because $R_c$ is known only to the customer network software 104 and $X_{MERCHANT}$ is known only to the merchant. They can share it between themselves, however, as soon as the merchant receives the value Z from the customer.

After computing D-H Key$_{MERCHANT}$, if the merchant quote indicates that further information is required from the customer, such as, e.g., address information for delivery of hard goods, the customer network software 104 extracts Bits(D-H Key$_{MERCHANT}$, 640, 40) for use with the 40-bit key bulk-cipher encryption algorithm (to be specified). The customer is prompted to enter in the appropriate information, denoted P40, which is then encrypted, resulting in cipher, denoted C40.

The values of Z and C40 are then inserted into a key exchange message 170 (FIG. 7B) and posted to the merchant.

In response to receipt of the key exchange message 170, the merchant network server 110 computes D-H Key$_{MERCHANT}$ (from Z) and uses Bits (D-H Key$_{MERCHANT}$, 640, 40) (which were used to encrypt P40) to decrypt C40. The resulting plaintext, P40, is appropriately stored in the merchant database 162. The merchant network server 110 then computes two 160-bit quantities: a number denoted QuoteCheck, which lets the customer network software 104 verify the origin and integrity of the merchant quote as well as the proper receipt and decryption of C40 by the merchant's network server 110, and a number, denoted QPAL (Quote-Pay Advice Link), which will be used later to link the quote to a payment advice:

$$\text{QPAL} = \text{SHA}(\text{Quote})$$

$$\text{QuoteCheck} = \text{SHA}(\sim\text{Quote} \| \text{P40} \| \text{Bits}(\text{D-H Key}_{MERCHANT}, 0, 160))$$

An encrypted form of QuoteCheck is inserted into a key response message 172 (FIG. 7C) which the merchant returns to the customer:

Encrypted QuoteCheck=Bits(D-H Key$_{MERCHANT}$, 160, 160)$\oplus$ QuoteCheck

The merchant saves the full text of the quote and the 160 bits Bits(D-H Key$_{MERCHANT}$, 0, 160) in the quotes table 164 its database 162. The 360 bits, Bits(D-H Key$_{MERCHANT}$, 320, 360), are saved until the completion of processing of this transaction.

Upon receipt of the key response message 172 from the merchant, the customer compares the results of its own computation of the value of Encrypted QuoteCheck to that value in the message 172.

If the check fails then the failure is logged, the customer is informed, the values of PIN, $R_c$, Z, D-H Key$_{MERCHANT}$, C40, QuoteCheck and Encrypted QuoteCheck within memory are overwritten and processing of this transaction ends.

On the other hand, if the check succeeds then the full text of the quote message as well as the 160 bits Bits(D-H Key$_{MERCHANT}$, 0, 160) are saved in the customer database 136 in the Quotes table 140. Three quantities are computed from D-H key$_{MERCHANT}$ and saved in the Pending table 154 until the conclusion of the processing of this transaction:

MERBITS1=Bits(D-H Key$_{MERCHANT}$, 320, 160)

MERBITS2=Bits(D-H Key$_{MERCHANT}$, 480, 160)

MERBITS3=Bits(D-H Key$_{MERCHANT}$, 640, 40)

Then the values of C40, QuoteCheck, Encrypted QuoteCheck and Bits(D-H Key$_{MERCHANT}$, 160, 160) are overwritten in memory.

It should be noted that in other embodiments, the information exchanged between the customer and merchant may be grouped differently, particularly in terms of when it is communicated and/or when it is verified. For example, the merchant certificate may be transmitted with the authenticated quote rather than as part of the original quote. The fact that in the preferred embodiment the merchant certificate is received and verified by the customer prior to the confirmation or cancellation of the purchase allows for safeguarding the customer's shipping address information against delivery to unintended parties, although this may not be considered a particularly significant breach of security.

3. Customer Composes Payment Request

At this point the customer network software 104 is ready to make a payment request 128 (step S206) to the CTA 102. Accordingly, the customer network software 104 then computes a Diffie-Hellman key, D-H Key$_{CTA}$, to be used to communicate with the CTA 102.

$$\text{D-H Key}_{CTA} = (Y_{CTA})^{Rc} \text{ modulo } p$$

The value of $R_c$ is the same value which was used to compute D-H Key$_{MERCHANT}$. The value of $R_c$ should be overwritten as soon as the computation of D-H Key$_{CTA}$ is made and should never be written to the disk.

As was the case with the merchant, the CTA 102 will be able to compute the Diffie-Hellman key it shares with the customer network software 104 just as soon as the customer network software 104 transmits its Diffie-Hellman public key component Z to the CTA 102. Unlike the merchant case however, there is only one communication in each direction. The Diffie-Hellman public key component of the CTA 102, $Y_{CTA}$, is known to the customer network software 104 prior to the start of communications. If the current CTA Diffie-Hellman public key component is not known to the customer network software 104, the communication discussed below will fail if the CTA 102 uses its current private Diffie-Hellman exponent. This is because the CTA 102 will be unable to determine the customer identity, which is encrypted under the Diffie-Hellman key. The Diffie-Hellman public key component of the customer will be included in the payment request message which will be discussed shortly.

Next the customer network software 104 has the customer generate 56 random bits, denoted RANDOM, e.g., with key strokes or mouse movements. Alternatively some hardware random source may be used. The value of RANDOM is temporarily written to the States table 156 of the customer database 136.

Next the customer network software 104 computes the value of PIN* using the typed-in value of PIN:

PIN*=PIN⊕ADD where ADD is either retrieved from the hard drive, or reset to zero if the customer indicates that this is the first-time use of a new PIN value. The typed-in value of PIN should be overwritten at this point.

Then the customer network software 104 updates the value ADD by replacing its current value with

ADD⊕RANDOM

The new value of ADD is stored in the States table 156 of the customer's local database 136. After the value of ADD is updated, the customer network software 104 fetches the number to be assigned to the next transaction (from field NEXTTRANS of the states table 156). The customer then creates an unsigned payment request, PR (FIG. 7D). The unsigned payment request PR is formed by concatenating the following:

the merchant identifier, denoted MID the merchant transaction identifier, denoted Tm the transaction amount, denoted T$ the Quote-Pay Advice Link, QPAL the customer subscriber identifier, denoted SID the customer transaction identifier, denoted Tc the customer account identifier, denoted AID the value of RANDOM the value of PIN*

The value of PIN* should be overwritten at this point. Then the customer creates a 160 bit hash:

$H_{PC}$=SHA(PR), after which PR should be overwritten. This is followed by computation of $H_{Final}$=SHA($H_{PC}$||DSAr(PR, customer)||DSAs(PR, customer))

In other embodiments the customer signature DSA (PR, customer) may be suppressed if non-repudiation is not a system requirement, since the transaction security is based primarily on the combined use of the customer PIN and Diffie-Hellman. It may be adequate in such an embodiment to let $H_{FINAL}=H_{PC}$.

The randomly generated per-message DSA exponent used to compute the DSA signature should be overwritten in memory as soon as the values DSAr (PR, customer) and DSAs (PR, customer) are computed. The hash value $H_{PC}$ should be overwritten after the calculation of $H_{Final}$.

Next the customer creates E, the portion of the message to be encrypted:

E=SID||Tc||AID||RANDOM||$H_{Final}$DSAs(PR, customer)

The values of $H_{Final}$ and DSAs(PR, customer) should be overwritten at this point.

Because the physical lengths of the quantities above are fixed, namely:

| | |
|---|---|
| SID | 32 bits |
| Tc | 32 bits |
| AID | 8 bits |
| RANDOM | 56 bits |
| $H_{Final}$ | 160 bits |
| DSAs(PR, customer) | 160 bits, | the result E is 448 bits long.

Then E is encrypted with the first 448 bits of the Diffie-Hellman key D-H Key$_{CTA}$ to yield the value E'

E'=Bits(D-H Key$_{CTA}$, 0, 448)⊕E

After E is encrypted Bits(D-H Key$_{CTA}$, 0, 448) used to encrypt it should be overwritten.

Next the customer network software 104 computes two 160-bit quantities which will be used to verify the authenticity of the response to its payment request CTABITS1=Bits(D-H Key$_{CTA}$, 448, 160)

CTABITS2=Bits(D-H Key$_{CTA}$, 608, 160)

Both CTABITS1 and CTABITS2 are temporarily stored in the Pending table 154 so that a payment advice message can be verified for authenticity even if it is received after a restart of the customer network software 104.

Finally a payment request message 128 that contains Z, MID, Tm, T$, QPAL, DSAr (PR, customer) and E' is composed. The payment request message is temporarily written to the database 136 (in Payment Requests 146) to address failures in transmission. Then it is Base64 encoded and posted to the URL of the CTA 102 that is embedded in the customer network software 104 executable.

4. CTA Processes Payment Request

Upon receipt of the payment request message 128 (step S208), the CTA 102 performs the following processing:

First the CTA 102 uses the value Z from the payment request message 128 to calculate the Diffie-Hellman key D-H Key$_{CTA}$ as follows:

D-H Key$_{CTA}$=z$^{Xcta}$ modulo p

Next the CTA 102 extracts E from the message and computes E:

E=Bits(D-H Key$_{CTA}$, 0,448)⊕E'

Because the lengths and locations of the fields SID (the customer subscriber identifier, 32 bits), Tc (the customer transaction identifier, 32 bits), AID (the customer account identifier, 8 bits), RANDOM (56 bits), H$_{Final}$ (160 bits) and DSAs (PR, customer) (160 bits) are known, the CTA 102 is able to recover these values from the calculated value of E.

The value of SID is then used to find the current value of PIN* and other values for this customer in the CTA database. If the recovered value of SID does not correspond to an actual customer subscriber ID, processing of the customer-specific data stops here.

Then the CTA 102 recomputes the hash value H$_{PC}$ (denoted H'$_{PC}$) from the values MID, Tm, T$ and QPAL which are in the plaintext portion of the message and SID, Tc, AID and RANDOM which were hidden in the message by Diffie-Hellman encryption, and PIN* from the CTA database. Recall that the customer computed the value of H$_{PC}$ as H$_{PC}$=SHA(PR), where PR was formed by the concatenation of MID, Tm, the transaction amount, T$, QPAL, the customer subscriber identifier, SID, the customer transaction identifier, Tc, the customer account identifier, AID, RANDOM and PIN*. The value H$_{Final}$=SHA (H$_{PC}$||DSAr(PR, customer)||DSAs(PR, customer)).

Then the CTA 102 computes H$_{Final}$' from H$_{PC}$', from DSAr(PR, customer) [within plaintext], and from DSAs(PR, customer) [after Diffie-Hellman decryption]. The values of H$_{Final}$ and H$_{Final}$' are then compared.

The customer signature may be reconstituted from its parts DSAs (PR, customer) and DSAr(PR, customer). In the event of a later attempted transaction repudiation by the customer, the CTA 102 can check the customer's signature if it is stored along with MID, Tm, T$, QPAL, SID, Tc, AID, RANDOM and PIN*. In the event of a dispute of the signature which causes the signature to be presented outside the CTA 102, the customer is expected to refresh the value of the logon-PIN, PIN. The CTA 102 enforces this by rejecting subsequent transactions.

Alternatively, if in the formation of H$_{PC}$ and H$_{FINAL}$, RANDOM and PIN* had been removed from PR, and if H$_{PC}$ within the computation of H$_{FINAL}$ had been replaced by H$_{PC}$||RANDOM||PIN*, then it would no longer be necessary for the CTA to force the customer to obtain a new value of the logon-PIN in the event the signature needs to be presented outside of the CTA. Whether data is input by the customer network software 104 as an input parameter to SHA within H$_{PC}$ or as an input parameter to SHA within H$_{FINAL}$, it has the same effect with respect to the CTA detecting whether the data integrity has been maintained. Alternatively, if in the formation of H$_{PC}$ and H$_{FINAL}$, if RANDOM and PIN* had been removed from PR, and if H$_{PC}$ within the computation of H$_{FINAL}$ had been replaced by H$_{PC}$||RANDOM||PIN*, then it would no longer be necessary for the CTA to force the customer to obtain a new value of the logon-PIN in the event the signature needs to be presented outside of the CTA. Whether data is input by the customer network software 104 as an argument of SHA within H$_{PC}$ or as an argument of SHA within H$_{FINAL}$, it has the same effect with respect to the CTA detecting whether the data integrity has been maintained.

The customer signature data needs to be stored only if H$_{Final}$ and H$_{Final}$' match.

The CTA's processing thus far is summarized as follows: First the payment request message is decrypted which provides the subscriber identifier (SID) and account number (AID). From this information, the customer's database account entry at the CTA 102 is available. The customer's account entry at the CTA includes PIN*, the last transaction number for this customer and other information including account balance information.

If the current transaction number is one more than the last transaction and the hashes verify then this is considered a good transaction.

The CTA 102 then composes an unsigned payment advice (PA) message. Additionally, the CTA 102 composes a message for use by the customer but not to be passed on to the merchant. This message includes customer advice (CA), e.g., "Insufficient funds."

The CTA 102 then signs the payment advice message 130.

If circumstances warrant that the CTA should update its value of the particular customer's PIN* as a result of this transaction, as outlined below, then the value of PIN* in the CTA's database is updated with the new value of RANDOM and with 56 bits from the CTA signature on the payment advice message 130. That is, PIN*=PIN*⊕RANDOM⊕Bits(DSAr(PA, CTA),0, 56).

Next the CTA 102 computes the hash value, H$_{CTA}$ of the payment advice PA, DSA(PA, CTA), CA and 160 bits of the Diffie-Hellman key, D-H Key$_{CTA}$:

H$_{CTA}$=SHA(PA||DSA(PA, CTA)||CA||Bits(D-H Key$_{CTA}$, 448, 160).

Then the hash H$_{CTA}$ is encrypted using the last 160 bits of the Diffie-Hellman key D-H Key$_{CTA}$:

E$_{CTA}$H$_{CTA}$⊕Bits (D-H Key$_{CTA}$, 608, 160)

The CTA 102 then composes its payment advice message (130, FIG. 7E) consisting of:

PA, DSA(PA, CTA), CA and E$_{CTA}$.

In addition to the above, the customer advice portion of the payment advice message 130 includes various flags that are used by the customer network software 104 to process the message. The flags include a PINFLAG, a TRANSFLAG, a RETRYFLAG and a PROTERRFLAG.

The flag PINFLAG is used to inform the customer network software 104 whether the CTA 102 updated the value of PIN* in its database. If the value of PINFLAG is "YES", then the CTA 102 has updated its PIN* as a result of the present transaction. Otherwise, if the value of PINFLAG is "NO", i.e., the CTA 102 indicates that the PIN was not updated.

The flag TRANSFLAG is used to inform the customer network software 104 whether it should increment the transaction number in its database 136.

The RETRYFLAG is used to inform the customer network software 104 that the customer may have incorrectly entered his PIN and that the customer network software 104 should offer the customer another chance to enter his PIN correctly. A value of "NO" for the RETRYFLAG indicates that no retry is permitted and that the customer's PIN has been invalidated by the CTA 102. A value of "YES" indicates that a retry is permitted, i.e., the maximum number of consecutive bad PIN* values has not been reached. The CTA 102 tracks the number of consecutive bad PIN* values using a variable BadPinCount for each customer.

The PROTERRFLAG is used to inform the customer network software 104 of protocol errors. A PROTERRFLAG value of "YES" indicates that an error has occurred.

The CTA 102 sets the flags as follows:

After checking that there is enough money in the customer's account to satisfy the dollar amount of the transaction, the CTA 102 checks the consistency and validity of PIN*.

There are six cases that can arise. The following description indicates how the CTA sets the flags in the preferred embodiment. It should be understood that in other embodiments the CTA may respond differently to the payment request message in how it sets these flags or it may use other flags:

Case 1

The database is blocked or the account number is invalid or the transaction number is out of range (not within one of the previous transaction.

In this case suspect an error or an attempted security breach. Leave database unchanged and set all flags to "NO". Unless service is unavailable at the CTA, the customer's payment advice message will ultimately bear the CTA signature and the Diffie-Hellman-based authentication of the customer advice, CA.

Case 2

The transaction is good. The hashes verify and the transaction number is okay.

Reset the BadPinCount variable (maintained by the CTA for each customer) to zero, Set PINFLAG="YES",

TRANSFLAG 32 "YES",

RETRYFLAG="YES", and

PROTERRFLAG="NO".

If the dollar amount is okay then post the debit.

Case 3

The Transaction number is okay but the hashes do not verify.

This is a bad PIN case, therefore the CTA increments the bad PIN count and checks it against a predetermined threshold. If the count exceeds the threshold then the account is blocked, and set PINFLAG="NO",

TRANSFLAG="NO",

RETRYFLAG="NO", and

PROTERRFLAG="NO".

Otherwise, set PINFLAG="NO" and RETRYFLAG="YES".

Case 4

The transaction number is the same as the previous transaction number and the payment request is identical to the previous payment request.

This is a duplicate transaction case. In this case the CTA gets the corresponding payment advice and does not update anything in the customer database (except possibly for a count of how many times this same transaction has been requested).

Case 5

The transaction number is the same as the previous transaction number, the hashes agree and the current payment request is not identical to the previous payment request.

This is a protocol error case.

Set PINFLAG="YES",

TRANSFLAG="YES",

RETRYFLAG="YES",

PROTERRFLAG="YES".

Case 6

The transaction number is the same as the previous transaction number, the hashes do not agree and the current payment request is not identical to the previous request.

This is identical to case 3.

This payment advice message 130 is Base64 encoded and then sent to the customer (step S212).

Although several of the computations done by the CTA have been described above as being done sequentially, the system has been designed to permit similar computationally intensive processing elements to be performed by the CTA in parallel. This is principally due to two factors which relate to the nature of the incoming and outgoing data, respectively:

(i) The incoming payment request message data is partitioned into plaintext and ciphertext, where the customer-specific data is in ciphertext and the merchant-related data is in plaintext. In order for the CTA to decrypt the ciphertext, it regenerates the Diffie-Hellman key using the received value of Z and its securely stored value of the exponent $X_{CTA}$. Once this session key is computed, the actual decryption to recover the customer-specific information, and the authentication of the customer advice and other information necessary for the creation of the customer's payment advice message, can both be done very quickly;

(ii) The plaintext data alone suffices for the CTA to prepare the merchant's payment advice message. In fact the two potential versions of this message, consisting of PA and DSA(PA,CTA), one which indicates the merchant is to be paid, and one which indicates the merchant is not be paid, can be prepared simultaneously as well.

5. Customer Receives and Processes Payment Advice from CTA and Forwards Part of Payment Advice to Merchant The customer network software 104 receives and processes the payment advice message 130 (step S214).

The payment advice message 130 includes the text of the payment advice which will be delivered to the merchant, PA, the CTA's signature on the payment advice, DSA(PA, CTA), a customer advice, CA, and an encrypted portion, $E_{CTA}$. The customer advice is that portion of the response which is appropriate for the customer but not appropriate for the merchant. For example a message that informs the customer that there are insufficient funds in his account to make a purchase is not required to be seen by the merchant. It is sufficient for the merchant to know that the payment will not be forthcoming.

The customer network software 104 retrieves the values PA, DSA(PA, CTA), CA and $E_{CTA}$ from the decoded message. These value are used for authentication purposes. It recovers a hash, $H_{CTA}$ which was calculated by the CTA 102:

$$H_{CTA} = E_{CTA} \oplus CTABITS2$$

Then the customer recalculates the hash from the value of fields in the clear text portion of the message and from D-H $Key_{CTA}$:

$$H_{CTA}' = SHA(PA \| DSA(PA, CTA) \| CA \| CTABITS1)$$

Note that if the payment advice is being received after a restart of the customer network software 104, CTABITS1 and CTABITS2 are retrieved from the Pending table 154.

If the values of $H_{CTA}'$ and $H_{CTA}$ are not the same, then the customer network software 104 may resend the payment request message to the CTA 102 a predetermined number of times, e.g., up to three more times. This count is kept and the limit enforced at the customer network software 104. The payment request message for resending may be fetched from the Payment Requests table 146 of the database 136 if a hardware failure occurs between transmissions. If after the maximum number of resends, the hashes still do not agree then CTABITS1 and CTABITS2 are overwritten in the database 136, the full text of the payment request is reset in the database and the update of ADD is undone:

$$ADD = ADD \oplus RANDOM,$$

and then RANDOM is reset to zero in the database. Then the failure is logged, the customer is informed and processing stops here. In this case, the customer may be required to go out-of-band in order to acquire a new value of the logon-PIN, PIN, prior to the next transaction.

If the values of the hashes $H_{CTA}'$ and $H_{CTA}$ do agree and PINFLAG defined below is set to "YES" by the CTA, then the value of ADD is adjusted:

$$ADD = ADD \oplus Bits(DSAr(PA, CTA), 0, 56).$$

In addition to the text mentioned above, the customer advice portion of the payment advice message also includes various flags that are used by the customer network software 104 as follows:

As noted above, the flag PINFLAG is used to inform the customer network software 104 whether the CTA 102 updated the value of PIN* in its database. If the value of PINFLAG is "YES", then the CTA 102 has updated its PIN* as a result of the present transaction. Accordingly, the customer network software 104 also updates its value of ADD. If the value of PINFLAG is "NO", i.e., the CTA 102 indicates that the PIN was not updated, then the customer resets ADD to its previous value by:

$$ADD = ADD \oplus RANDOM$$

The flag TRANSFLAG is used to inform the customer network software 104 whether it should increment the transaction number in its database 136. The customer network software 104 increments the transaction number field CTRANS in the States table 156 if and only if the TRANSFLAG field contains a "YES". If the CTA 102 indicates that the transaction number has been incremented then the customer network software 104 updates the field CTRANS in the States table 156. Note that it is only when the CTA 102 indicates that the transaction has been updated that the customer network software 104 increments its transaction number.

The RETRYFLAG is used to inform the customer network software 104 that the customer may have incorrectly entered his PIN and that the customer network software 104 should offer the customer another chance to enter his PIN correctly. A value of "NO" for the RETRYFLAG indicates that no retry is permitted and that the customer's PIN has been invalidated by the CTA 102. A value of "YES" indicates that a retry is permitted, i.e., the maximum number of consecutive bad PIN* values has not been reached.

If the customer wants to retry the transaction. If so a new values of $R_c$ and RANDOM are generated, the customer is prompted to reenter his PIN and a new payment request message for the same transaction is generated and transmitted as above. Note that it is the responsibility of the CTA 102 to inform the customer as to whether he may retry the same payment with another PIN. The customer network software 104 need not keep track of PIN failures. It is possible that the customer's account may have been used without his knowledge and that his account is blocked. In that case he gets no more retries.

The PROTERRFLAG is used to inform the customer network software 104 of protocol errors. A PROTERRFLAG value of "YES" indicates that an error has occurred, in which case the customer network software 104 displays the text portion of the customer advice and offers the customer the opportunity to retry the transaction after assignment of a new $T_c$ (CTRANS) and the generation of a new RANDOM and a new $R_c$. If the customer advice contains a "YES" in the PROTERRFLAG then the transaction is marked as aborted in the State table 156 and the text of the customer advice is copied to the TEXT field of this table. Processing of the current transaction terminates here notwithstanding the fact that the customer may retry the same transaction, without either requesting or authenticating new quote, after the reentry of the customer's PIN, and new values for RANDOM, $R_c$ and $T_c$. If PROTERRFLAG is set to "YES" this forces the customer network software 104 to increment CTRANS by one, independent of the response by the customer network software 104 to the setting of TRANSFLAG.

The text portion of the customer advice is displayed to the customer. In particular, customer advice may indicate that the customer must acquire a new value of PIN. When the CTA 102 denies the payment, the customer advice will clearly indicate it.

Following the update of ADD, the customer network software 104 resets RANDOM to zero in the database and overwrites the values of CTABITS1 and CTABITS2.

At the conclusion of customer network software 104 processing of CTA 102 data, both the payment request message and D-H $Key_{CTA}$ should have been overwritten in memory.

Next the customer network software 104 uses the merchant identifier and the merchant transaction identifier to retrieve the quote from the Quotes table 140 in its database 136. The customer then composes a merchant's payment advice message 131 (FIG. 7F) which contains the payment advice portion of the message it received, PA, and the CTA's signature on it, DSA(PA, CTA). The message is Base64 encoded and the resultant text is posted to the payment URL which is contained in the merchant's quote (step S214).

6. Merchant Processes Payment Advice from Customer

Upon receipt of the merchant's payment advice message 131 (step S216), the merchant network server 110 decodes the payment advice message and checks it for validity. The checks include the following:

- a verification of the CTA's signature;
- a comparison of the merchant identifier in the payment advice message with the identifier assigned to the merchant by the MCC;
- a scan of the Quotes table for one which includes the merchant transaction identifier found in the payment advice message;
- a comparison of the secure hash of the quote against the value of QPAL in the payment advice message. Note that QPAL may either have been pre-computed and stored, or may now be computed from the stored value of the quote a comparison of the amount in the payment advice message against the amount in the original quote; and
- a comparison of the current time against the expiration time in the quote.

In the event that any of the checks fail then the merchant network server 110 logs the specific failure(s).

If the CTA signature does not verify correctly or the merchant identifier is incorrect then processing stops here, with the proviso that the customer network software 104 can successively retransmit if necessary. The merchant responds to a newly received payment advice message for which the CTA signature verifies correctly and the merchant identifier is correct either with a shipping advice message (SA) (178, FIG. 7G), in the case it accepts the payment or with a payment refused message (PREF) (180, FIG. 7H), when it does not. In the currently preferred embodiment, it is the individual seller's responsibility to ensure that he does not unintentionally ship goods multiple times for the same transaction. If the CTA 102 signature DSA(PA, CTA) verifies correctly, and PA indicates the merchant is not to be paid, the merchant network server 110 can delete all data associated with the particular transaction after sending the (authenticated) payment refused message (PREF), provided it does not reuse that value of the merchant transaction identifier. Either $$SA\|[MERBITS2 \oplus SHA(SA\|MERBITS1)]$$

or $$PREF\|[MERBITS2 \oplus SHA(PREF\|MERBITS1)]$$

is then transmitted to the customer network software 104.

The customer network software 104 retrieves MERBITS1 and MERBITS2 from the Pending table 154 to verify the authenticity of either SA or PREF.

If the merchant responds with a correctly verifiable payment-refused message 180, then the error is logged, the customer is informed and processing stops here.

If the merchant responds with a correctly verifiable shipping advice message 178, then there are two cases. If physical goods have been bought, then the advice 178 includes any text from the merchant that describes the time and method of delivery. The text is presented to the customer and processing ends normally.

In the case that digital goods have been bought then the shipping advice includes the type of goods, a suggested file name, the number of transmissions from the merchant to the customer network software 104 that will be required to receive the goods followed by the length and secure hash of each transmission to follow. The shipping advice message also includes a location (Delivery URL) where the customer can get the goods.

7. Customer Gets the Goods

The customer network software 104 then presents a dialog to the customer that asks for the location on the customer's computer to which the digital goods will be written.

Next the customer network software 104 sends a send-goods message to the merchant. The customer network software 104 knows how much data the merchant should return because that information was included in the shipping advice message.

The merchant responds with a digital-goods message (182, FIG. 7I). Note that the goods are encrypted by the merchant on the fly using a forty bit key bulk cipher encryption algorithm. The forty bit key is taken from MERBITS3.

Upon receipt of the digital goods message 182, the customer network software 104 decodes the message from Base64 format to binary and then uses MERBITS3 to decrypt the digital goods. Next it applies the secure hash algorithm to the plaintext digital goods. The length of the data received and its hash is compared against that in the shipping-advice message. If the comparison succeeds then the data is written to the file that the customer specified. If the comparison fails, the error is logged, the customer is informed and processing stops here.

The customer network software 104 then checks the shipping advice message 178 for the number of transmissions expected from the merchant. If more pieces remain, the process repeats until all pieces are received. If not, the customer is informed that his goods have been delivered and processing ends normally.

At the conclusion of processing, whether or not the above comparison fails, the only bits of D-H Key$_{MERCHANT}$ which should be retained by the customer are Bits (D-H Key$_{MERCHANT}$, 0, 160) denoted Retain160. The values of MERBITS1, MERBITS2, and MERBITS3 should be overwritten.

VIII. Previous-transaction Mode

There are a number of cases where a customer will want to do something about a previous transaction. For example, if a customer did not receive goods paid for, the customer may request a refund or retransmission of the goods. A customer may also wish to register a complaint about a particular merchant with the CTA 102 or a customer may wish to query the CTA about a particular previous transaction.

Accordingly, the customer network software 104 enters a Previous-transaction Mode upon customer input indicating processing instructions which may be in the form of a refund request, a retransmission of electronic goods request, or a query/complaint. The processing instructions include a counter value, transaction number, with respect to the particular original transaction. In the case of a request to a merchant for retransmission of electronic goods, the customer network software 104 refers to the original shipping advice in order to format a send-goods message and to process the delivered goods. The send-goods message may specify the re-delivery of only those portions of the electronic goods which were not received or which were not received correctly (e.g., which did not hash correctly to the associated secure hash value within the shipping advice).

The customer network software 104 indicates to the merchant that it intends to transmit in previous-transaction mode. The merchant network server 110 returns the merchant's current Diffie-Hellman certificate (issued on setup by the CA 124). The customer network software 104 verifies the merchant's certificate with the CA's public DSA key and, if successful, presents all pertinent information to the customer. If the merchant's certificate cannot be verified or the certificate can be verified but the merchant identifier, MID, within the certificate does not agree with the value of MID in the original stored quote, then an entry is written to the transaction log and the customer is informed of the failure. As an additional security measure, the customer should be required to confirm or cancel the transaction based on the displayed certificate information. If the customer cancels then no further processing is required. If the customer confirms the transaction, then the customer network software 104 generates new values for $R_c$, D-H $Key_{MERCHANT}$ and $Z=g^{Rc}$ modulo p.

Then a previous-transaction mode message (184 in FIG. 7J) is generated and transmitted to the merchant. The previous-transaction mode message 184 includes the following:

the value of Z ($g^{Rc}$ modulo p for the new value of $R_c$);

the original merchant transaction identifier, Tm, and Date of Transaction (both within original merchant quote and taken from the customers local database 136);

The value Bits (D-H $Key_{MERCHANT}$, 0, 160)⊕Retain160 using the newly calculated value of D-H $Key_{MERCHANT}$;

Processing Instructions; and

Bits (D-H $Key_{MERCHANT}$, 320,160)⊕SHA (Processing Instructions||Bits(D-H $Key_{MERCHANT}$, 160,160)).

In the case of a request for the retransmission of electronic goods request, the 40 bits to be used as the encryption/decryption key when the merchant subsequently transmits his electronic goods are contained in Bits(D-H $Key_{MERCHANT}$, 480, 40).

A previous-transaction mode message 184 is considered to be received intact by a merchant if the value of Retain160 as stored by the merchant network server 110 matches the information retrieved from the previous-transaction mode message, and if the secure hash of the processing instructions is correct. Otherwise the received previous-transaction mode message is considered by the merchant to be not-intact.

The merchant network server 110 responds to an intact previous-transaction mode message 184 by transmitting its computation of Bits(D-H $Key_{MERCHANT}$, 520, 40). The merchant network server 110 responds to a not-intact previous-transaction mode message 184 by transmitting its computation of Bits(D-H $Key_{MERCHANT}$, 560, 40).

The merchant network server 110 updates the status of the particular original transaction in its database. The merchant network server may not fulfill an intact request if the transaction number within the processing instructions does not exceed the highest transaction number the merchant has seen within an intact request referring to that particular original transaction. The merchant may also limit the number of times it honors retransmission of electronic goods requests.

Refunds operate as follows: each customer maintains a local database of transactions. If a transaction is incomplete or merchandise or information is not delivered, the Customer can choose to enter Previous-Transaction Mode (PTM). The merchant can retransmit the information or provide a refund, perhaps depending on the desire of the customer. The merchant initiates a refund with a message to the MCC. The MCC debits the merchant's account and sends a request for payment to the CTA 102 which credits the customer's account.

In the preferred embodiment, a refund amount from the merchant of $0.00 indicates that the refund request from the customer has been refused.

The merchant also may specify in the initial contact with the customer that there will be no refunds. The merchant sets a refunds-not-processed flag in the quote. In this case, the customer network software 104 will automatically deny refund requests initiated by the customer within Previous Transaction Mode.

In other embodiments, refund processing may be different. For example, if the merchant is paid but no payment advice was issued (due to, e.g., an interrupted transaction), the merchant can initiate a refund to the MCC to clear the records.

CTA Processing of Merchant Data

With respect to refund requests:

The CTA 102 receives via the MCC 114 refund requests signed by the merchant, or information from the MCC 114 which indicates which transactions have been authorized for refunds by merchants. In the preferred embodiment a particular transaction cannot be refunded more than one time. In alternative embodiments these requests can be checked for duplicates prior to issuing refunds to the appropriate customer account, where the merchant may legitimately issue multiple refunds for the same transaction.

IX. Delayed or Exception Processing and Service Requests

A customer may wish to have various transactions with a CTA relating to the customers account status or to the status of particular transactions. For example, a customer may request account statement information, account funding information, evidence of a previous transaction and the like.

1. Customer Processing of Service Request

To make one of these requests, the customer sends the appropriate service request message to the CTA 102.

A customer may request any of the following in a service request message:

information about one or more refunds previously requested from a particular merchant (Refund Information Message 186, FIG. 7K);

information about one or more transfers from the customer's bank into his CTA account, i.e., fundings information (Funding Information Message 188, FIG. 7L);

information about the customer's account, i.e., statements (Statement Information Message 190, FIG. 7M); and information about a previously paid transaction, i.e., external evidence (External Evidence Message 192, FIG. 7N).

External evidence acts to attach identity to a previous anonymous transaction with a merchant. That is, it serves as a means to re-contact a merchant via the CTA 102, regarding, for example, a transaction for which the payment advice may or may not have reached the merchant, but the merchant was credited for the transaction.

A successfully executed external evidence request, initiated by the customer to the CTA 102, results in authenticated notification to the merchant of the pertinent transaction information, including QPAL=SHA(quote). In the preferred embodiment, an external evidence request is denied if the original transaction did not result in a previous credit to the merchant's account correspondingly debited from the evidence-requesting customer's account. The information forwarded to the merchant may include the refund status of the transaction.

In the preferred embodiment, the notification to the merchant occurs whether or not a refund has been requested of the merchant and/or processed. Notifications to the merchant may be aggregated and delivered as part of the regular merchant-transaction statement (or as a separate statement). A successfully executed external evidence request results in a CTA-signed binding of the original transaction information to the customer's account information as it is known to the CTA 102. In the preferred embodiment, the notification to the merchant regarding an external evidence request does not include the customer's account information. Furthermore, the association of the account to the person's actual name or other bank-held information must be provided by the bank. This proof-of-association may be provided to the customer as part of the hard-copy documentation delivered to the customer as part of customer setup. In this case, the customer must retain a bank-authenticated original copy of the document, which may later be provided to a third party if necessary. Alternatively, the customer may be required to acquire such documentation from his bank on an as-needed basis.

As noted above, to make one of these service requests, the customer sends the appropriate service request message to the CTA 102. First the customer network software 104 generates a 160-bit random value $R^*_c$ using some well-known mechanism. Next the customer network software 104 computes a Diffie-Hellman public key component, $Z^*$:

$$Z^* = g^{R^*_c} \text{ modulo } p$$

Then the customer network software 104 computes a Diffie-Hellman key to be used to communicate with the CTA 102

$$\text{D-H Key}^*_{CTA}\ (Y_{CTA})^{R^*_c} \text{ modulo } p$$

The CTA 102 will be able to compute the Diffie-Hellman key it shares with the customer network software 104 as soon as the customer network software 104 transmits its Diffie-Hellman public key component $Z^*$ to the CTA 102. The Diffie-Hellman public key component of the CTA 102 is known to the customer network software 104 prior to the start of communications. If the current CTA Diffie-Hellman public key component is not known to the customer network software 104, the communication discussed below will fail if the CTA 102 uses its current private Diffie-Hellman exponent, because the CTA 102 will be unable to determine the customer's identity which is encrypted under the Diffie-Hellman key. The Diffie-Hellman public key component of the customer will be included in the service request message discussed below.

Next the customer generates a 56-bit random value RANDOM*, e.g., with key strokes and mouse movements (alternatively some hardware source may be used to generate this value). The value of RANDOM* is temporarily written to the customer database 136. The customer network software 104 then computes the value of PIN* using a typed-in value of PIN:

$$\text{PIN}^* = \text{PIN} \oplus \text{ADD}$$

where ADD is either retrieved from the hard drive, or reset to zero if the customer indicates that this is the first-time use of a new PIN value. The value of PIN should be overwritten at this point.

Then the customer network software updates the value of ADD by replacing its current value by:

$$\text{ADD} \oplus \text{RANDOM}^*$$

The value of ADD is then updated in the database 136 and the value of RANDOM is temporarily stored there too. The next transaction number, CTRANS, is retrieved from the States table 156 in the database 136 and the customer network software 104 creates an unsigned service request, SR. The service request SR (FIG. 7Q) is formed by concatenating the following values:

the service-request information field, SIF;
the customer subscriber identifier, SID;
the customer transaction identifier, Tc;
the customer account identifier, AID;
the value RANDOM*; and
the value of PIN*.

The value of PIN* should be overwritten at this point.

In the case of a customer statement request, the service request information field SIF includes the statement parameters which designate the scope of the desired statement.

In the case of an external evidence request, SIF includes the information relating to the appropriate payment advice, MID and Tm.

Then the customer creates a 160-bit hash value $$H^*_{PC} = \text{SHA(SR)},$$

after which the value of SR should be overwritten. This is followed by computation of $$H^*_{Final} = \text{SHA}(H^*_{pc} \| \text{DSAr(SR, customer)} \| \text{DSAs (SR, customer)}),$$

after which the value of $H^*_{PC}$ should be overwritten.

In other embodiments the customer signature DSA(SR, customer) may be suppressed if non-repudiation is not a system requirement, since the transaction security is based primarily on the combined use of the customer PIN and Diffie-Hellman. It may be adequate in such an embodiment to let $H^*_{FINAL} = H^*_{PC}$.

The randomly generated per-message DSA exponent used to compute the DSA signature should be overwritten in memory as soon as DSAr(SR, customer) and DSAs (SR, customer) are computed.

Next the customer creates the portion of the message to be encrypted:

$$E^* = \text{SID} \| \text{Tc} \| \text{AID} \| \text{RANDOM}^* \| H^*_{Final} \| \text{DSAs(SR, customer)}$$

The values of $H^*_{Final}$ and DSAs(SR, customer) should be overwritten at this point. Because the physical lengths of the quantities above are fixed, namely

| | |
|---|---|
| SID | 32 bits |
| Tc | 32 bits |
| AID | 8 bits |
| RANDOM* | 56 bits |
| $H^*_{Final}$ | 160 bits |
| DSAs(SR, customer) | 160 bits, | the result E* is 448 bits long.

The value of E* is then encrypted with the first 448 bits of the Diffie-Hellman key to yield E*'

$$E^{*'} = \text{Bits(D-H Key}^*_{CTA}, 0, 448) \oplus E^*$$

The values of E* and Bits(D-H Key*$_{CTA}$, 0, 448) should be overwritten at this point. Next the customer network software 104 computes two quantities to be used to verify the authenticity of the response to its service request, namely $$\text{CTABITS1} = \text{Bits(D-H Key}^*_{CAT}, 448, 160)$$

$$\text{CTABITS2} = \text{Bits(D-H Key}^*_{CTA}, 608, 160)$$

Both CTABITS1 and CTABITS2 are temporarily stored in the Pending table 154 so that a service advice message can be verified for authenticity even if it is received after a restart of the customer network software 104.

Finally a service request message 196 that contains Z*, SIF, DSAr(SR, customer) and E*' is composed and then Base64 encoded. The complete text of the service request message is temporarily stored in the database 136 (in the Service Requests table 148) so that communication failures can be addressed. The resultant text of the message is sent to the CTA 102, e.g., by posting it to the URL of the CTA that is embedded in the customer network software 104 executable.

The CTA responds to a service request message with a Base64 encoded service advice message 194 (FIG. 7P). The customer network software 104 decodes the service advice message. The service advice message includes a randomly generated Diffie-Hellman key component $Z_{SERVICE}$, a system-wide value $N_{MAGIC}$ uniquely identifying this request, a customer advice, CA*, and an encrypted portion, $E^*_{CTA}$.

The customer network software 104 retrieves the values of $Z_{SERVICE}$, $N_{MAGIC}$, CA* and $E^*_{CTA}$ from the decoded message. It then recovers a hash, $H^*_{CTA}$ which was calculated by the CTA 102:

$$H^*_{CTA} = E^*_{CTA} \oplus CTABITS2$$

Then the customer recalculates the hash from the value of fields in the clear text portion of the message and from D-H $Key^*_{CTA}$:

$$H^*_{CTA}{}' = SHA(Z_{SERVICE} \| CA \| N_{MAGIC} \| CTABITS1)$$

If the values of $H^*_{CTA}{}'$ and $H^*_{CTA}$ are not the same, then the customer network software 104 may resend the service request message up to a predetermined number of times, e.g., three more times. The service request message may be fetched from the service requests table 148 of the database 136 if a failure occurs between transmissions. If, after the maximum number of resends, the hashes still do not agree then CTABITS1 and CTABITS2 are overwritten, the full text of the service request message is reset in the database, $R^*_c$ is overwritten in memory, and the update of ADD is undone:

$$ADD = ADD \oplus RANDOM^*,$$

and then RANDOM* is reset to zero in the database, and the failure is logged and processing stops. In this case, the customer may be required to go out-of-band in order to acquire a new value of the logon-PIN, PIN, prior to the next transaction.

If the hashes agree and PINFLAG is set to "YES" by the CTA, then the value of ADD is adjusted:

$$ADD = ADD \oplus Bits(Z_{SERVICE}, 0, 56).$$

If the hashes agree and the service advice message indicates that the transaction has been accepted, the customer network software 104 computes a Diffie-Hellman session key which it shares with the CTA 102

$$\text{D-H Key}_{SERVICE} = (Z_{SERVICE})^{R^*_c}$$

The customer network software 104 overwrites $R^*_c$ after the computation of D-H $Key_{SERVICE}$ is completed. The value of $R^*_c$ should never be written to disk.

From the session key a decryption key and an authentication are computed. The customer network software 104 computes a key to be used to decrypt the message when it is subsequently delivered with $$DECRYPTKEY = Bits(\text{D-H Key}_{SERVICE}, 0, 40)$$

and a key to be used to verify the authenticity of the subsequent message $$AUTHKEY = Bits(\text{D-H Key}_{SERVICE}, 40, 320)$$

The customer network software 104 then inserts the values of CTRANS, $N_{MAGIC}$, DECRYPTKEY and AUTHKEY into a new row in the Pending table 154. Finally, the transaction number field CTRANS of the States table 156 is incremented.

If the service advice message 194 indicates that the transaction has not been accepted then the customer network software 104 must refer to flags in the customer advice, CA*. If the CTA 102 indicates that PIN* was not updated then ADD is restored to its prior value:

$$ADD = ADD \oplus RANDOM^*$$

The text portion of CA* is displayed to the customer. CA* may indicate, in particular, that the customer must acquire a new value of PIN. CA* should indicate if the requested service will not later be provided to the customer.

Following the update of ADD, the customer network software 104 resets RANDOM* to zero in the database and overwrites CTABITS1 and CTABITS2.

At the conclusion of customer network software 104 processing of the CTA 102 response to a service request, both the service request message and D-H $Key^*_{CTA}$ should be overwritten in memory.

In addition to the text mentioned above, the customer advice portion of the service advice message also includes flags. These flags have the same meaning as the corresponding flags described above for payment requests.

If the PROTERRFLAG is set in the customer advice then the transaction is marked as aborted in the State table 156 and the text of the customer advice is copied to the TEXT column of this table. Processing of the current service request terminates here notwithstanding the fact that the customer network software 104 may offer the customer the opportunity to make the same request without further customer input except the reentry of the customer's PIN and after generating new values for RANDOM*, $R^*_c$ and $T_c$ (CTRANS). If PROTERRFLAG is set to "YES" the customer network software 104 increments the value of CTRANS by 1 independent of the response by the applet to the setting of TRANSFLAG.

There is a complication associated with the use of the service request message resend mechanism. If the customer's computer has crashed, for example, and if the resend is being attempted after a restart, then the value of $R^*_c$ is unavailable. It is too sensitive a quantity to write to disk. The resend done here is necessary in order that the customer not have to request a new PIN as would be the case if the response to the request were not received intact at the customer network software 104 and if the value of PIN* were updated at the CTA 102. However, because the value of $R^*_c$ is not available, the encrypted data prepared in response to the request and made available as explained below after an appropriate data retrieval- and processing-driven delay, is useless because it may not be decrypted. Therefore, if one of the resends results in successful receipt of the service advice message in that the hashes agree in the customer network software 104, and if the values of PIN* and $T_c$ were good, but the value of $R^*_c$ is apparently no longer available due to a crash, the customer network software 104 may offer the customer an opportunity to re-enter his PIN and redo the transaction with an incremented transaction number.

The customer network software 104 must give the customer the opportunity to request responses to the four requests above at a time of his choosing. The Pending table 154 may enumerate all the requests for which responses have not been received. To request a response the customer network software 104 composes a message which contains the number, $N_{MAGIC}$, and posts it to the CTA 102, or a query server designated to handle these requests.

The service data response provided to the customer includes the service data, SERD, as well as DSA(SERD, CTA), all encrypted under a forty-bit key bulk-cipher encryption algorithm using Bits (D-H Key$_{SERVICE}$, 0, 40). ENSERD denotes the ciphertext which results from DES-encrypting SERD‖DSA(SERD, CTA). The service data response also includes 160 bits of authentication data, $E_{SERVICE}$, and the length l of ENSERD. SERD is specified to be a multiple of 64 bits.

In the case of a successfully executed customer statement request, SERD includes the statement data.

In the case of a successfully executed external evidence request, SERD includes PA and Account Identifying Information. In order for the CTA 102 to process the external evidence request, PA is retrieved from the appropriate archived transaction database, while DSA(SERD, CTA)= DSA([PA‖Account Identifying Information], CTA) is computed by the CTA 102 in response to the external evidence request.

In any case, the customer retrieves ENSERD and $E_{SERVICE}$ from the message. It recovers a hash, $H_{SERVICE}$:

$$H_{SERVICE}' = E_{SERVICE} \oplus Bits(\text{D-H Key}_{SERVICE}, 200, 160)$$

It recalculates the hash:

$$H_{SERVICE}' = SHA(1\|ENSERD\|Bits(\text{D-H Key}_{SERVICE}, 40, 160))$$

If $H_{SERVICE}$ and $H_{SERVICE}'$ are not the same then the failure is logged. In this case the customer network software 104 may attempt to resend the same request message up to a predetermined number of times, e.g., three more times. The customer decrypts ENSERD, of length l, using Bits (D-H Keys$_{SERVICE}$, 0, 40) to recover SERD and DSA (SERD, CTA). Where $H_{SERVICE}$ and $H_{SERVICE}'$ are the same, SERD and DSA(SERD, CTA) can be entered in the customer database. The value of Bits(D-H Key$_{SERVICE}$, 0, 360) should now be overwritten.

2. CTA Processing of Service Request

Upon receipt of a service request message, the CTA 102 uses the value of Z* to calculate the Diffie-Hellman key D-H Key*$_{CTA}$:

$$\text{D-H Key*}_{CTA} = Z^{*Xcta} \text{ modulo } p$$

The CTA 102 then extracts E*' from the message and computes the value E*:

$$E^* = Bits(\text{D-H Key*}_{CTA}, 0, 448) \oplus E^{*'}$$

Since the lengths of each of SID, Tc, AID, RANDOM, $H^*_{Final}$ and DSAs (SR, customer) are known, the CTA 102 is able to recover these values from E*.

The value of SID is used to find the customer's current value of PIN in the CTA database. If the recovered value of SID does not correspond to an actual customer subscriber ID, processing of the customer-specific data stops here.

Next the CTA 102 recomputes the value of hash $H^*_{PC}$ from the value of SIF which is in the plaintext portion of the message and SID, Tc, AID and RANDOM* which were hidden by Diffie-Hellman encryption, and PIN* from the CTA 102 database. Denote this computed value by $H^*_{PC}'$. Then the CTA 102 computes $H^*_{Final}'$ from $H^*_{PC}'$, from DSAr(SR, customer) within plaintext, and from DSAs(SR, customer) after Diffie-Hellman decryption.

The values of $H^*_{Final}$ and $H^*_{Final}'$ are then compared.

The customer signature may be reconstituted from its parts DSAs(SR, customer) and DSAr(SR, customer). In the event of a later attempted transaction repudiation by the customer, the CTA 102 may then check the customer's signature if it is stored along with SIF, SID, Tc, AID, RANDOM* and PIN*. In the event of a dispute of the signature which causes the signature to be presented outside the CTA 102, the customer is expected to refresh the value of the logon-PIN, PIN. The CTA 102 enforces this by otherwise rejecting subsequent transactions. Alternatively, if in the formation of $H^*_{PC}$ and $H^*_{FINAL}$, RANDOM* and PIN* had been removed from SR, and if $H^*_{PC}$ within the computation of $H^*_{FINAL}$ had been replaced by $H^*_{PC}\|RANDOM^*\|PIN^*$, then it would no longer be necessary for the CTA to force the customer to obtain a new value of the logon-PIN in the event the signature needs to be presented outside of the CTA. Whether data is input by the customer network software 104 as an input parameter of SHA within $H^*_{PC}$ or as an input parameter of SHA within $H^*_{FINAL}$, it has the same effect with respect to the CTA detecting whether the data integrity has been maintained.

The customer signature data needs to be stored only if the values of $H^*_{Final}$ and $H^*_{Final}'$ match.

The CTA 102 either generates or extracts from secure storage a new randomly generated Diffie-Hellman key component, $Z_{SERVICE}$. $Z_{SERVICE} = g^{Rservice}$ modulo p, where D-H Key$_{SERVICE} = (Z_{SEVICE})^{R*c}$ modulo $p = Z^{*Rservice}$ modulo p is later used to encrypt and authenticate the requested-service information to the customer. The computed value of D-H Key$_{SERVICE}$ will not actually be used in the event that $H^*_{FINAL} \neq H^*_{FINAL}'$ since in that case the preferred embodiment specifies that the requested service will not be performed. The CTA 102 can either compute D-H Key$_{SERVICE}$ and then discard Z*, or save Z* so that D-H Key$_{SERVICE}$ can later be computed from Z and R$_{SERVICE}$. The value of R$_{SERVICE}$ need not be known by the CTA 102 if another entity encrypts and authenticates the requested-service information destined for the customer.

The CTA 102 composes a message for use by the customer which includes customer advice CA*.

If circumstances warrant that the CTA should update its value of the particular customer's PIN* as a result of this transaction, as outlined above with respect to the CTA's processing of payment requests, then the value of PIN* in the CTA's database is updated with the new value of RANDOM* and with 56 bits from $Z_{SERVICE}$.

$$PIN^* = PIN^* \oplus RANDOM^* \oplus Bits (Z_{SERVICE}, 0, 56)$$

This differs from the PIN* updating equation for CTA processing of payment requests in that the Diffie-Hellman key component $Z_{SERVICE}$ rather than the DSA signature DSA(PA,CTA) is used for the update.

Next the CTA 102 computes a hash, $H^*_{CTA}$ of $Z_{SERVICE}$, CA*, $N_{MAGIC}$ and 160 bits of D-H Key*$_{CTA}$:

$$H^*_{CTA} = SHA(Z_{SERVICE}\|CA^*\|N_{MAGIC}\|Bits(\text{D-H Key*}_{CTA}, 448, 160))$$

Then the hash $H^*_{CTA}$ is encrypted using the last 160 bits of D-H Key*$_{CTA}$.

$E^*_{CTA} = H^*_{CTA} \oplus \text{Bits}(\text{D-H Key}^*_{CTA}, 608, 160)$

The CTA 102 then composes its service advice message, consisting of $Z_{SERVICE}, N_{MAGIC}, CA^*$ and $E^*_{CTA}$.

Although several of the computations done by the CTA have been described above as being performed sequentially, the system has been designed to permit similar computationally intensive processing elements to be performed by the CTA in parallel. This is principally due to two factors which relate to the nature of the incoming and outgoing data, respectively:

The incoming payment request message data is partitioned into plaintext and ciphertext portions, where the customer-specific data is in the ciphertext portion. In order for the CTA to decrypt the ciphertext, it regenerates the Diffie-Hellman key D-H Key$^*_{CTA}$ using the received value of $Z^*$ and its securely stored value of the exponent $X_{cta}$. Once this session key is computed, the actual decryption to recover the customer-specific information, and the authentication of the customer advice and other information necessary for the creation of the service advice message, can both be done very quickly.

The received value of $Z^*$ alone suffices for the CTA to prepare the Diffie-Hellman session key, D-H Key$_{SERVICE}$, from a randomly generated exponent, $R_{SERVICE}$, to be used to encrypt and authenticate the separately transmitted service data intended for the customer network software The computation of this key can be done simultaneously with the computation of the CTA's Diffie-Hellman public key component, $Z_{SERVICE}$, which is to be transmitted to the customer network software to enable the customer network software to regenerate D-H Key$_{SERVICE}$ in order to verify and decrypt the separately transmitted service data.

When the requested service data, SERD, is available, the CTA generates DSA(SERD,CTA). Then D-H Key$_{SERVICE}$ is used to encrypt and authenticate the data, after which D-H Key$_{SERVICE}$ can be deleted from the CTA database:

$H_{SERVICE} = \text{SHA}(1\|\text{ENSERD}\|\text{Bits}(\text{D-H Key}_{SERVICE}, 40,160))$ $E_{SERVICE} = H_{SERVICE} \oplus \text{Bits}(\text{D-H Key}_{SERVICE}, 200, 160)$ ENSERD=the encryption of (SERD||DSA(SERD,CTA)) under a forty bit bulk cipher encryption algorithm using Bits(D-H Key$_{SERVICE}$, 0,40).

3. CTA Processing of Merchant Data

In the case of a successfully executed external evidence request initiated by a customer:

These are sorted by merchant, and itemized information relevant to all such transactions specifying a given merchant and processed during the current merchant statement cycle, including QPAL but excluding reference to customer identifying information is bundled and signed by the CTA 102 for inclusion in the next merchant statement. The merchant statement also bears a signature of the MCC prior to transmission to the merchant.

4. Summary of Merchant/MCC Communications

As a result of merchant setup, the merchant's DSA public key has been registered and the merchant network server 110 has the DSA public key information of both the MCC 114 and CTA 102. The merchant can transmit to the MCC 114 at any time a signed refund request specifying a particular transaction. Each merchant statement is signed by the MCC 114 prior to transmittal to the merchant. In the case of information relevant to CTA-fulfilled external evidence requests, the value of QPAL, but not customer account information is included in the merchant statement. If the value of QPAL does not agree with the merchant database record of SHA (Quote), then the corresponding transaction apparently was not previously successfully executed between the customer and merchant.

The detailed statement, showing each payment received, is sent to the merchant via some form such as electronic mail. When electronic mail is used, the merchant may select any electronic mail address for delivery of the mail, including, e.g., his Internet server's address. The merchant network server 110 allows merchants to request a new copy of the last detailed statement received. Statements are sent to the merchant via electronic mail. The detailed merchant statement and complete records maintained on the merchant network (Internet) server may be used to verify accuracy of each payment. Individual payments may be matched by the merchant identifier and merchant transaction identifier. The merchant's bank statement should contain a payment in the amount matching the total indicated in the detailed statement from the MCC 114.

Because the initial transmission of each statement is expected by the merchant at set intervals, this digitally signed data from the MCC may also include other notifications to the merchant, such as notification of missing receipts of delivery of previous statements or external evidences from the MCC to the merchant, where such receipts should have been received by the MCC as signed and sent by the merchant.

5. Summary

The payment advice message which the agent issues to the customer in response to the customer's payment request message, has two parts one of which includes the other. The customer processes one part of the message to the extent necessary and sends the other part on to the merchant. Thus, the customer is able to verify whether the entire payment advice message came unchanged from the agent and has not been corrupted along the way. Without completely processing the actual content of the message, the source of the entire message can be verified. Accordingly, when the customer sends the part of the message to the merchant, the customer knows that he is sending something that came from the agent.

This general structure, that is, splitting the payment advice message into two parts, enables additional parallelism with respect to the agent's processing in creating the payment advice message.

Note that the Diffie-Hellman session key operation (between the customer and the agent) serves two functions. The first function is the encryption between them and the second is the customer being able to verify the authenticity of data coming from the agent. This helps the agent as follows: in order to prepare the information (in the payment advice) needed only by the merchant, no customer specific information is needed by the agent.

This structure also helps preserve anonymity of the customer. The customer specific information is sent encrypted from the customer to the agent, and this information can be decrypted in parallel with the preparation of the data intended for the merchant. That is, while the agent is decrypting the customer's information (sent encrypted), it can begin to prepare the payment advice. For example, the agent can prepare both an acceptance and a rejection of the transaction and then select one of them based on processing it performs after the decryption of the customer information.

The generation of the Diffie-Hellman key on the agent's end (the session key process) is parallelized with the creation of the merchant's part of the payment advice. This encryption actually serves three purposes. First, the customer authenticates himself to the agent.

The same Diffie-Hellman session key is used to authenticate the integrity of the data from the customer to the agent as coming from the owner of the PIN (that is, as coming from that customer).

The customer and merchant set up a Diffie-Hellman key, distinct from the key that the customer and agent set up, that lets the customer know that he is dealing with the merchant. That is how the merchant authenticates the data to the customer. In the preferred embodiment, the customer's only authentication of data to the merchant, versus the merchant's authentication of data to the customer, happens in the so-called previous transaction mode.

Under the circumstances that a merchant sends hard goods he is to send them to an address which was sent encrypted from the customer to the merchant. That address gets associated at the merchant with that particular merchant transaction identifier. When a merchant gets a payment advice message, he knows what address it refers to. In particular, it could happen that the particular quote to which the payment advice message refers to gets paid for by someone else, but if that payment advice message relates to hard goods, the one who receives the goods is the one who initiated the process with the merchant. If the transaction relates to soft goods, the goods will get encrypted using part of the Diffie-Hellman key, so that only the customer who initiated the process will have ready access to the plaintext goods.

When the customer sends his shipping address to the merchant, it is encrypted but not authenticated. But when the merchant authenticates the quote, he also authenticates the shipping address that he received from the customer. So a customer will not send a payment request to an agent unless the authenticated shipping information from the merchant matches the customer's actual shipping information.

In the preferred embodiment, a portion of the payment request information is digitally signed by the customer. The CTA system rules designate at what point and under what circumstances this signature is verified. Since this the transaction security is based primarily on the combined use of the customer PIN and Diffie-Hellman, in other embodiments the customer signature may be suppressed. A similar observation holds true for service request messages.

In order to effect the anonymity provided by this invention, the merchant network server need not conceal any information from its authorized users.

X. Additional Embodiments and Features

A. Frequent Customer Number Feature

In some embodiments, the system supports the use of a frequent customer number feature. This number can be encrypted and delivered from the merchant to the customer as (part of) electronic goods. This (long-term) number can be inserted as (part of) the shipping address information when the customer places an order with the merchant. In some embodiments the retrieval of the number from the electronic goods and its input into the shipping address information may not require user intervention.

Alternatively, the frequent customer number may be chosen by the customer.

The merchant can offer incentives to the customer for giving its linkage information.

B. Other Embodiments

While the invention has been described with specific key sizes, the bit-lengths of the various quantities may be chosen differently than they are in the preferred embodiment. In the preferred embodiment, all bits of the Diffie-Hellman key are used by the customer and the CTA. However, in the communication between the customer and the merchant, not all bits are used. Unlike this embodiment it is possible that not all bits of Diffie-Hellman keys established between customers and the CTA are actually designated for encryption/authentication of data. The Diffie-Hellman modulus length, which determines the Diffie-Hellman key length, must be chosen large enough to resist attacks against the discrete logarithm even if not all bits of the Diffie-Hellman key are earmarked for use.

The merchant's certificates issued by the CA 124, whether or not X.509, may include additional information relating to characteristics of the particular merchant (subject to legal/liability constraints). For instance, the merchant may specify no refunds in the certificate.

The CTA may include additional customer information in the payment advices. Such information could include the state of residence of the customer for tax purposes, the age range of the customer, and the like (subject to legal/liability constraints).

The quantity RANDOM (described above) may be used for DES encryption of data transmitted from the customer to the CTA 102, and/or for DES encryption of payment advice messages and/or other data transmitted from the CTA to the customer. RANDOM is a 56-bit quantity which can be used directly as a 56-bit DES key, or which can have its entropy downward-adjusted to say 40-bits so that the resulting 56-bit DES key meets export control criteria regardless of the nature of the data.

While the system has been described above with respect to particular preferred embodiments, other embodiments are envisioned.

In one other embodiment, the customer/merchant quote-negotiation session is eliminated. The merchant identifier, MID, and the merchant transaction number, $T_m$, are obtained via processes external to the system. For example, in a subway token system, the MID may equal the number for a train station, posted conspicuously behind the ticket booth glass, and the value of $T_m$ may be obtained from a merchant server which increments $T_m$ each time it is accessed. In this embodiment, care is taken in the delivery of the payment advice (e.g., subway token) from the CTA to the customer in order to prevent useful theft. Accordingly, the pay advice message may be encrypted, using an external process such as SSL, or using the quantity RANDOM for DES encryption. In this case the quote and QPAL=SHA(quote) may be suppressed. Alternatively, the customer software may be configured to construct a random "quote" and include QPAL=SHA("quote") in the payment advice request. In this case, successful payment to the merchant requires delivery of a value of "quote" which hashes to QPAL. In order to secure the delivery of the payment advice information from the customer to the merchant, devices such as card readers may be installed to read the tokens.

In another embodiment, the customer electronically submits information to be processed (i.e., to be printed, faxed, copied, etc.) to a merchant. This may be done locally at the site of the service-providing machine. Then the quote is computed by the merchant (i.e., a service-providing machine), and includes the payment amount as determined by the page-count, etc.

Bill Paying

In another embodiment, customers and merchants can have pre-established relationships. For example, a merchant may be a local utility company or a telephone company. The customer may then set up a pre-authorized payment from his bank to the merchant, the payment being triggered by the merchant's receipt of a payment advice from the customer. In this case the payment advice takes on a more general function of notifying a merchant that it can initiate the pre-authorized payment.

In some embodiments, the customer establishes a pre-authorized payment with an upper limit, for example, $200. Then the quote from the merchant specifies the actual amount that the customer must pay. When the customer obtains a payment advice from the agent and forwards it to the merchant, this payment advice authorizes the merchant to initiate the transfer of the actual amount from the customer's bank to the merchant's bank.

Notably in this case the actual payment from the customer to the merchant can take place outside of the system. Either the customer or the merchant or both can pay a fee to the agent for issuing the payment advice.

While the invention has been described with reference to particular cryptographic mechanisms (algorithms, processes and functions) and key management architectures, one skilled in the art would realize that other cryptographic mechanisms and/or key management architectures could be used while still achieving the invention. The choice of cryptographic mechanisms depends on a number of factors including but not limited to an assessment of the risk versus the amounts of money involved.

While embodiments of the present invention have been described with particular setup and initialization procedures, other setup and/or initialization procedures can be used.

Further, while many of the operations have been shown as being performed in a particular order, one skilled in the art would realize that other orders, including some parallelization of operations, are possible and are considered to be within the scope of the invention.

While the present invention has been described with reference to payment requests and payment advices in an electronic commerce system, these requests and advices are considered to be general constructs covering other, non-payment systems and transactions.

Thus, an electronic commerce system is provided. One skilled in the art will appreciate that the present invention can be practiced by other than the described embodiments, which are presented for purposes of illustration and not limitation, and the present invention is limited only by the claims that follow.

What is claimed:

1. A method of payment in an electronic payment system wherein a plurality of customers have accounts with an agent, the method comprising:

each customer sharing a respective secret between that customer and the agent;

obtaining, by a customer of the plurality of customers, electronic signals representing an authenticated quote from a specific merchant of a plurality of merchants, the quote including a specification of goods and a payment amount for those goods, wherein the quote is verifiable only by the customer;

sending from the customer to the agent in a single authenticated one-pass communication, a payment request message as electronic signals representing a request for payment of the payment amount to the specific merchant and a unique identification of the customer;

the agent issuing and sending to the customer, in a single one-pass communication electronic signals representing an authenticated verifiable payment advice message, the issuing being based only on (a) the single communication from the customer to the agent, (b) the secret shared between the customer and the agent, and (c) status information which the agent has;

the customer forwarding electronic signals representing a portion of the payment advice message to the specific merchant; and the specific merchant providing the goods to the customer in response to receiving the electronic signals representing the portion of the payment advice message.

2. A method as in claim 1 wherein the respective secret shared between the customer and the agent is a dynamic secret.

3. A method as in claim 2 wherein the secret shared between the customer and the agent is modified based on a previous transaction between the customer and the agent.

4. A method as in claim 2 wherein the secret shared between the customer and the agent is modified based on information generated by the customer in a previous transaction with the agent.

5. A method as in claim 2 wherein the secret shared between the customer and the agent is modified based on information generated by the agent in a previous transaction between the customer and the agent.

6. A method as in claim 2 wherein the secret shared between the customer and the agent is modified based on information generated by the customer and on information generated by the agent in a previous transaction between the customer and the agent.

7. A method as in claim 1 wherein the payment request message includes customer-generated modification information for the shared secret.

8. A method as in claim 1 wherein the payment advice message includes modification information for the shared secret.

9. A method as in claim 1 wherein the payment request message includes first modification information for the shared secret and wherein the payment advice message includes second modification information for the shared secret.

10. A method as in claim 9 wherein a subsequent transaction between the customer and the merchant uses a new shared secret based on the current shared secret and on the first and second modification information.

11. A method as in claim 1 wherein the quote is authenticated using a key generated for a specific session between the customer and the merchant.

12. A method as in claim 11 wherein the key is generated using a Diffie-Hellman technique.

13. A method as in claim 1 where the payment advice indicates that payment will be made to the specific merchant.

14. A method as in claim 1 where the payment advice indicates that payment has been made to the specific merchant.

15. A method as in claim 1, wherein the payment request message identifies a particular transaction, and wherein the payment advice message identifies the same transaction.

16. A method as in claim 1 wherein the only representation of the goods to the agent is an irreversible unambiguous function of the quote within the payment request message.

17. A method as in claim 1 further comprising the merchant verifying the validity of the received portion of the payment advice message prior to providing the goods to the customer.

18. A method of payment in an electronic payment system wherein a plurality of customers have accounts with an agent, the method comprising:

each customer sharing a respective secret between that customer and the agent;

sending to the agent in a single authenticated communication from a customer of the plurality of customers, a payment request message as electronic signals representing a request for payment of a specific amount to a specific merchant and a unique identification of the customer, wherein the authenticated communication is indistinguishable by the agent from a communication which was generated solely by the customer without any customer/merchant interaction; and the agent issuing a payment advice message based only on: (a) the payment request message, (b) the secret shared between the customer and the agent, and (c) status information which the agent has, the payment advice message bearing a verifiable digital signature of the agent over part of its content.

19. A method as in claim 18 wherein the agent issues the payment advice message to the customer, the method further comprising:

the customer forwarding electronic signals representing a portion of the payment advice message to the specific merchant; and the specific merchant providing goods to the customer in response to receiving the electronic signals representing the portion of the payment advice message.

20. A method as in claim 19 further comprising:

the merchant verifying the validity of the digital signature contained in the received payment advice message portion.

21. A method as in claim 18 where the payment advice message indicates that payment will be made to the specific merchant.

22. A method as in claim 18 where the payment advice message indicates that payment has been made to the specific merchant.

23. A method as in claim 18, wherein the payment request message identifies a particular transaction, and wherein the payment advice message identifies the same transaction.

24. A method of payment in an electronic payment system wherein a plurality of customers have accounts with an agent, the method comprising:

each customer sharing a respective secret between that customer and the agent;

receiving at the agent from a customer of the plurality of customers, a single authenticated communication comprising electronic signals representing a payment request message comprising a request for payment of a specific amount to a specific merchant and a unique identifier of the customer, wherein the authenticated communication is indistinguishable by the agent from a communication which was generated solely by the customer without any customer/merchant interaction; and issuing by the agent to the customer a payment advice message which bears a verifiable digital signature computed over part of its content, the issuing being based only on: (a) the payment request message, (b) the secret shared between the customer and the agent, and (c) status information known by the agent.

25. A method as in claim 24 wherein the agent issues the payment advice message to the customer, the method further comprising:

the customer forwarding electronic signals representing a portion of the payment advice message to the specific merchant; and the specific merchant providing goods to the customer in response to receiving the portion of the payment advice message.

26. A method as in claim 24 where the payment advice indicates that payment will be made to the specific merchant.

27. A method of payment in an electronic payment system wherein a plurality of customers have accounts with an agent and wherein each customer shares a respective secret between that customer and the agent, the method comprising, at a specific merchant:

forming a session key for a specific session between the customer and the specific merchant;

receiving from a customer electronic signals representing a portion of a payment advice message issued by the agent, the payment advice message indicating that payment will be made to the specific merchant, wherein the payment advice identifies an authenticated quote previously provided by the merchant to the customer, and wherein the quote is verifiable only by the customer; and providing goods to the customer in response to receiving the electronic signals representing the portion of the payment advice message.

28. A method as in claim 27 further comprising, by a customer:

receiving the electronic signals representing the payment advice message from the agent; and forwarding electronic signals representing the portion of the payment advice message to the specific merchant.

29. A method as in claim 27 wherein the goods provided are goods specified in the quote.

30. An electronic payment system comprising:

an agent mechanism;

a plurality of merchant mechanisms;

a plurality of customer mechanisms having accounts with the agent mechanism, each customer mechanism sharing a respective secret with the agent mechanism; and a mechanism constructed and adapted to send in a single authenticated communication to the agent mechanism, from a customer mechanism of the plurality of customer mechanisms, a payment request message as electronic signals representing an identifier for the customer mechanism and a request for payment of a specific amount from the customer mechanism to a specific merchant mechanism of the plurality of merchant mechanisms, wherein the authenticated communication is indistinguishable by the agent from a communication which was generated solely by the customer without any customer/merchant interaction; and a mechanism constructed and adapted to issue, from the agent mechanism, electronic signals representing an authenticated verifiable payment advice message in response to only: (a) the payment request message received by the agent mechanism, (b) the secret shared between the customer mechanism and the agent, and (c) status information known by the agent mechanism.

31. A system as in claim 30 further comprising:

a mechanism constructed and adapted to forward electronic signals representing a portion of the payment advice from a customer mechanism to a merchant mechanism; and a mechanism constructed and adapted to provide goods from the merchant mechanism to the customer mechanism in response to receipt of the electronic signals representing the payment advice.

32. An agent mechanism, in an electronic payment system comprising the agent mechanism, a plurality of customer mechanisms and a plurality of merchant mechanisms, the customer mechanisms having accounts with the agent mechanism and each customer mechanism sharing a respective secret with the agent mechanism, the agent mechanism comprising:

a mechanism constructed and adapted to receive, from each customer mechanism of the plurality of customer mechanisms, a payment request message as electronic signals representing a single authenticated communication comprising an identifier for the customer mechanism and a request for payment of a specific amount to a specific merchant mechanism of the plurality of merchant mechanisms, wherein the authenticated communication is indistinguishable by the agent from a communication which was generated solely by the customer mechanism without any customer/merchant interaction; and a mechanism constructed and adapted to issue electronic signals representing an authenticated verifiable payment advice message in response to only: (a) a received payment message from a customer mechanism by the agent mechanism, (b) the respective secret shared between the customer mechanism and the agent mechanism, and (c) status information known by the agent mechanism.

33. A customer mechanism, in an electronic payment system comprising an agent mechanism, a plurality of customer mechanisms and a plurality of merchant mechanisms, the customer mechanisms having accounts with the agent mechanism and each customer mechanism sharing a respective secret with the agent mechanism, the customer mechanism comprising:

a mechanism constructed and adapted to send a payment request message as electronic signals in a single authenticated communication comprising an identifier for the customer mechanism and a request for payment of a specific amount to a specific merchant mechanism, wherein the authenticated communication is indistinguishable by the agent from a communication which was generated solely by the customer mechanism without any customer/merchant interaction; and a mechanism constructed and adapted to receive electronic signals representing an authenticated verifiable payment advice issued by the agent mechanism in response to only: (a) a received payment request message from a customer mechanism by the agent mechanism, (b) the secret shared between the customer mechanism and the agent mechanism, and (c) status information known by the agent mechanism.

34. A customer mechanism as in claim 33 further comprising:

a mechanism constructed and adapted to obtain electronic signals representing an authenticated quote from a specific merchant mechanism of the plurality of merchant mechanisms; and a mechanism constructed and adapted to forward electronic signals representing a portion of the payment advice message to the specific merchant mechanism, the portion of the payment advice message identifying the quote.

35. A customer mechanism as in claim 34, wherein said quote specifies goods, the customer mechanism further comprising:

a mechanism constructed and adapted to receive the specified goods from the specific merchant mechanism.

36. A customer mechanism as in claim 35 further comprising a mechanism constructed and adapted to re-forward the electronic signals representing the portion of the payment advice message to the specific merchant mechanism when the goods are not received from the specific merchant mechanism because of non-receipt of the payment advice message by the merchant mechanism.

37. A merchant mechanism, in an electronic payment system comprising an agent mechanism, a plurality of customer mechanisms and a plurality of merchant mechanisms, the customer mechanisms having accounts with the agent mechanism and each customer mechanism sharing a respective secret with the agent mechanism, the merchant mechanism comprising:

a mechanism constructed and adapted to provide electronic signals representing an authenticated quote to a customer mechanism, the quote specifying goods, wherein the authenticated quote is verifiably only by the customer mechanism; and a mechanism constructed and adapted to receive electronic signals representing a verifiable portion of a digitally signed payment advice message issued by the agent mechanism in response to only: (a) electronic signals representing a received single communication from a customer mechanism by the agent mechanism, (b) the secret shared between the customer and the agent, and (c) status information known by the agent mechanism.

38. A merchant mechanism as in claim 37, wherein the portion of the payment advice message identifies a function of the goods, the merchant mechanism further comprising:

a provider mechanism constructed and adapted to provide the goods to the customer mechanism in response to receipt of the electronic signals representing the portion of the payment advice message.

39. A merchant mechanism as in claim 38 wherein the provider mechanism provides for authentication and encryption of portions of the goods which comprise electronic signals.

40. A method of payment in an electronic payment system wherein a plurality of customers have accounts with an agent, the method comprising:

each customer sharing a respective dynamic secret between that customer and the agent;

obtaining, by a customer of the plurality of customers, electronic signals representing an authenticated quote from a specific merchant of a plurality of merchants, the quote including a specification of goods and a payment amount for those goods, the authenticated quote being verifiable only by the customer;

sending from the customer to the agent a payment request message as electronic signals representing a request for payment of the payment amount to the specific merchant and a unique identification of the customer;

the agent issuing and sending to the customer electronic signals representing an authenticated verifiable payment advice message, the issuing being based only on: (a) the payment request from the customer to the agent, (b) the dynamic secret shared between the customer and the agent and, (c) status information known by the agent;

the customer forwarding electronic signals representing a portion of the payment advice message to the specific merchant; and the specific merchant providing the goods to the customer in response to receiving the electronic signals representing the portion of the payment advice message.

41. A method of payment in an electronic payment system wherein a plurality of customers have accounts with an agent, the method comprising:

each customer sharing a respective secret between that customer and the agent;

obtaining, by a customer of the plurality of customers, electronic signals representing an authenticated quote from a specific merchant of a plurality of merchants, the quote including a specification of goods and a payment amount for those goods;

sending from the customer to the agent a payment request message as electronic signals representing a request for payment of the payment amount to the specific merchant and a unique identification of the customer, the authenticated quote being verifiable only by the customer;

the agent issuing and sending to the customer electronic signals representing an authenticated verifiable payment advice message, the issuing being based only on: (a) the payment request from the customer to the agent, (b) the secret shared between the customer and the agent, and (c) status information known by the agent;

the customer forwarding electronic signals representing a portion of the payment advice message to the specific merchant; and the specific merchant providing the goods to the customer in response to receiving the electronic signals representing the portion of the payment advice message, wherein the merchant is unable to associate the origin of this transaction with prior transactions from the same customer.

42. A method of payment in an electronic payment system wherein a plurality of customers have accounts with an agent, the method comprising:

each customer sharing a respective secret between that customer and the agent;

obtaining, by a customer of the plurality of customers, electronic signals representing an authenticated quote from a specific merchant of a plurality of merchants, the quote including a specification of goods and a payment amount for those goods, the authenticated quote being verifiable only by the customer;

sending from the customer to the agent a payment request message as electronic signals representing a request for payment of the payment amount to the specific merchant and a unique identification of the customer;

the agent issuing and sending to the customer electronic signals representing an authenticated verifiable payment advice message, the issuing being based only on: (a) the payment request from the customer to the agent, (b) the secret shared between the customer and the agent and (c) status information known by the agent;

the customer forwarding electronic signals representing a portion of the payment advice message to the specific merchant; and the specific merchant providing the goods to the customer in response to receiving the electronic signals representing the portion of the payment advice message, wherein transactions cannot be linked to customers by anyone other than the agent.

43. A method of payment in an electronic payment system wherein a plurality of customers have accounts with an agent, the method comprising:

each customer sharing a respective secret between that customer and the agent;

obtaining, by a customer of the plurality of customers, electronic signals representing an authenticated quote from a specific merchant of a plurality of merchants, the quote including a specification of goods and a payment amount for those goods, the authenticated quote being verifiable only by the customer;

sending from the customer to the agent a payment request message as electronic signals representing a request for payment of the payment amount to the specific merchant and a unique identification of the customer;

the agent issuing and sending to the customer electronic signals representing an authenticated verifiable payment advice message, the issuing being based only on: (a) the payment request from the customer to the agent, (b) the secret shared between the customer and the agent, and (c) status information known to the agent;

the customer forwarding electronic signals representing a portion of the payment advice message to the specific merchant; and the specific merchant providing the goods to the customer in response to receiving the electronic signals representing the portion of the payment advice message, whereby the encrypted session between customer and merchant creates a unique customer/merchant shared secret which acts as the sole authenticated reference for this transaction.

44. A method of payment in an electronic payment system wherein a plurality of customers have accounts with an agent, the method comprising:

each customer sharing a respective secret between that customer and the agent;

obtaining, by a customer of the plurality of customers, electronic signals representing an authenticated quote from a specific merchant of a plurality of merchants, the quote including a specification of goods and a payment amount for those goods, the authenticated quote being verifiable only by the customer;

sending from the customer to the agent a payment request message as electronic signals representing a request for payment of the payment amount to the specific merchant and a unique identification of the customer;

the agent issuing and sending to the customer electronic signals representing an authenticated verifiable payment advice message, the issuing being based only on: (a) the payment request from the customer to the agent, (b) the secret shared between the customer and the agent, and (c) status information known to the agent;

the customer forwarding electronic signals representing a portion of the payment advice message to the specific merchant; and the specific merchant providing the goods to the customer in response to receiving the electronic signals representing the portion of the payment advice message, wherein the agent issues the payment message without verifying the quote and wherein the customer does not send the full quote to the agent.

45. A method of payment in an electronic payment system wherein a plurality of customers have accounts with an agent, the method comprising:

each customer sharing a respective secret between that customer and the agent;

obtaining, by a customer of the plurality of customers, electronic signals representing an authenticated quote from a specific merchant of a plurality of merchants, the quote including a specification of goods and a payment amount for those goods, the authenticated quote being verifiable only by the customer;

sending from the customer to the agent a payment request message as electronic signals representing a request for payment of the payment amount to the specific merchant and a unique identification of the customer;

the agent issuing and sending to the customer electronic signals representing an authenticated verifiable payment advice message, the issuing being based only on: (a) the payment request from the customer to the agent, (b) the secret shared between the customer and the agent, and (c) status information known to the agent;

the customer forwarding electronic signals representing a portion of the payment advice message to the specific merchant; and the specific merchant providing the goods to the customer in response to receiving the electronic signals representing the portion of the payment advice message, wherein the merchant issues the quote verifiable only by the customer.

46. A method as in claim 1 further comprising generating a session key for a specific session between the customer and the merchant.

47. A method as in claim 46 wherein the key is generated using a Diffie-Hellman technique.

* * * * *